US005084868A

United States Patent [19]

Kelly et al.

[11] Patent Number: 5,084,868

[45] Date of Patent: Jan. 28, 1992

[54] COMMON BUS MULTINODE SENSOR SYSTEM

[75] Inventors: Thomas F. Kelly, Washington, D.C.; Eric H. Naviasky, Baltimore, Md.; Daniel W. Jefferies; William P. Evans, both of Glen Burnie, Md.; John R. Smith, Monroeville, Pa.

[73] Assignee: Westinghouse Electric Corp., Pittsburgh, Pa.

[21] Appl. No.: 193,698

[22] Filed: May 13, 1988

Related U.S. Application Data

[62] Division of Ser. No. 934,238, Nov. 20, 1986, Pat. No. 4,770,842.

[51] Int. Cl.[5] .......... H04J 1/02; H04J 1/00

[52] U.S. Cl. .......... 370/69.1; 340/310 R; 370/124

[58] Field of Search .......... 370/45, 50, 69.1, 70, 370/73, 121, 124; 340/310 A, 310 R, 870.12, 870.13, 870.18; 455/2, 3, 4, 6, 75, 76; 375/36, 62, 65

[56] References Cited

U.S. PATENT DOCUMENTS

| | | | |
|---|---|---|---|
| 4,290,134 | 9/1981 | Hampshire | 340/870.12 |
| 4,422,073 | 12/1983 | Winner | 340/870.18 |
| 4,538,136 | 8/1985 | Drabing | 375/65 |
| 4,730,183 | 3/1988 | Crowe | 340/870.12 |

*Primary Examiner*—Douglas W. Olms
*Assistant Examiner*—Wellington Chin
*Attorney, Agent, or Firm*—M. G. Panian

[57] ABSTRACT

The present invention is a multimode sensor system that transmits power down a common bus coaxial cable typically using an alternating current power source. Each remote unit connected to the coaxial cable and through an isolation transformer converts the alternating current power to direct current power for an integrated circuit bus interface. The interface is connected to the sensors. The interface is externally pin programmable to provide a carrier at a frequency for a channel assigned to the remote unit. The carrier is provided by a ripple counter producing a frequency divided signal compared to a fixed reference frequency, where the result of the comparison controls a voltage controlled oscillator. When plural low frequency analog signals are to be transmitted over the common bus, an on-chip multiplexer multiplexes the signals to an off-chip, external analog-to-digital converter. The analog-to-digital converter loads an on chip parallel to serial register that applies each bit of the sampled signal serially to an on chip Manchester encoder. The encoder modifies the input voltage of the voltage controlled oscillator operating at the carrier frequency. The oscillator signal is applied to the coaxial cable. Receivers at the end of the coaxial cable are each tunable to a designated carrier frequency and each decode the respective encoded signal. If a high frequency analog signal is supplied to the voltage controlled oscillator, the carrier is modulated by the high frequency signal and the receiver demodulates the signal. The integrated circuit is arranged so that the digital circuitry is generally isolated from the analog circuitry so noise immunity is enhanced.

3 Claims, 38 Drawing Sheets

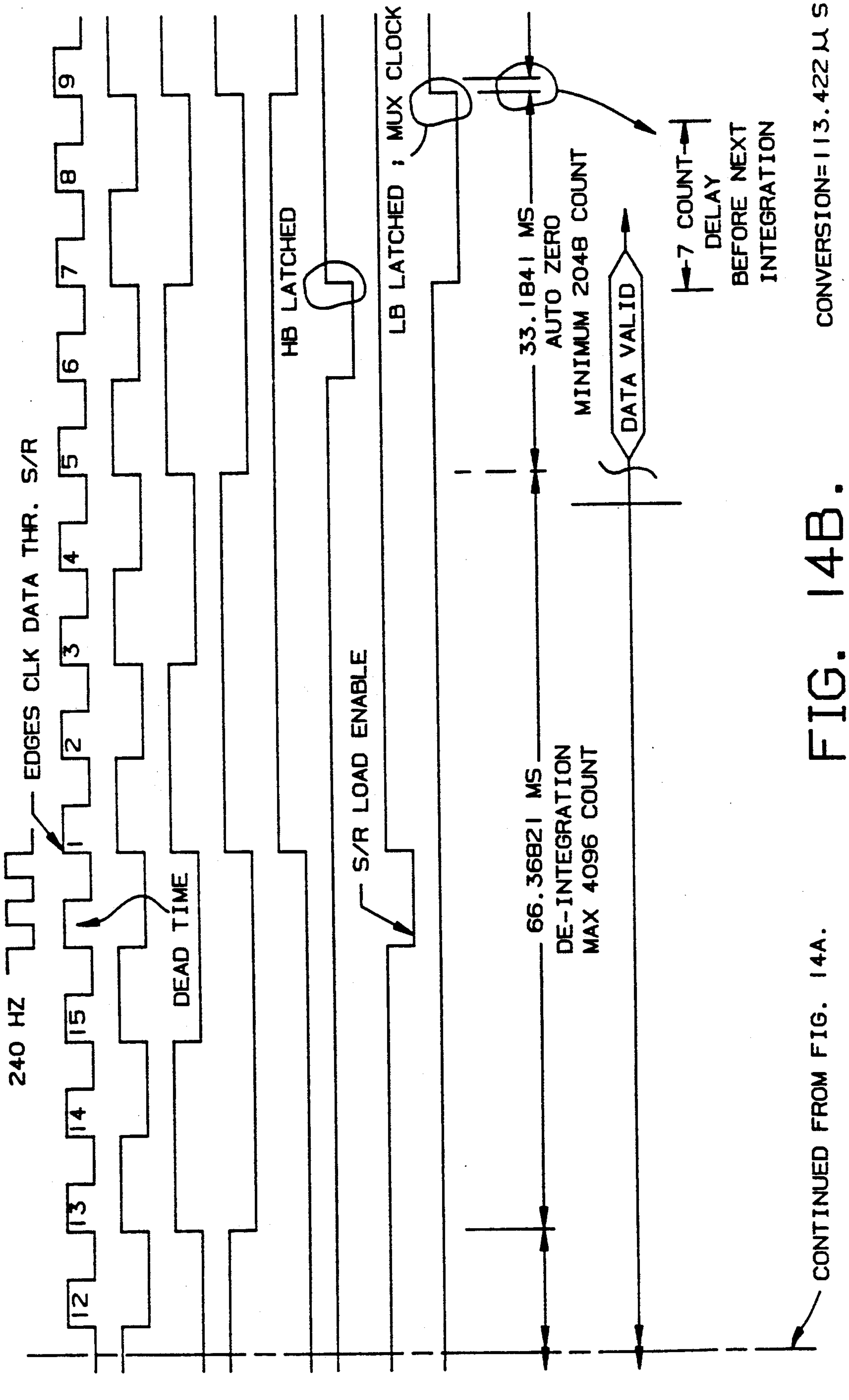
CONVERSION=113.422 μS
FIG. 14B.
CONTINUED FROM FIG. 14A.

L
M
DATA=DATA+1
974
976
DATA=DATA+0
978
BIT-CTR=
BIT-CTR+1
980
P1.5=0
K
982
BIT-
CTR=15
?
YES
984
P
N
NO
ARRAY-POINT
=ARRAY-POINT
+1
SET TIMER
TO 8.2ms
994
986
ARRAY-
POINT
= 17
?
NO
YES
966
SET TIMER 0
TO 200 μs
ARRAY-POINT
=0
996
988
TRO=1
998
BUF
(ARRAY-POINT)
=DATA
ST-BIT-FLAG=1
ST-BIT-CTR=0
990
SET REGISTER
BANK TO 0
RETURN
FROM
INTERRUPT
SET TIMER
TO 4.1ms
992
920

COMMON BUS MULTINODE SENSOR SYSTEM

U.S. Pat. No. 4,770,842 issued Sept. 13, 1988.

BACKGROUND OF THE INVENTION

1. Field of the Invention

The present invention is directed to a common bus multinode sensor system that allows multiple remote units to simultaneously transmit over the common bus using frequency division multiplexing and, more particularly, to a system that provides power to the remote units via the bus and allows low speed digital, low frequency analog signals and high frequency analog signals to be transmitted over the bus to receivers which demodulate the analog signals and decode the digital signals.

2. Description of the Related Art

Closed loop communication systems for facilities such factories and nuclear power plants require the capability of transmitting digital, low frequency analog and high frequency analog signals from a plurality of spaced apart points to a central location through an environment full of electromagnetic noise. Such systems typically require that the communication medium such as a twisted wire pair, coaxial cable or optical light guide be spread out through a very large complex requiring a media up to two kilometers in length. Prior art methods of providing such closed loop networks typically provide synchronous data transmission over a transmit channel and a receive channel. These systems poll each remote unit separately and, as a result, operate using a time division multiplexing scheme. The use of time division multiplexing does not allow plural sensors to be sampled simultaneously. The prior art systems also require power supplies at each remote unit producing ground loop problems as well as requiring that extra power wires be provided to the remote units.

SUMMARY OF THE INVENTION

It is an object of the present invention to provide a communications system that allows slow speed digital as well as low frequency and high frequency analog signals to be simultaneously transmitted for a plurality of sensors.

It is another object of the present invention to power remote units over a common bus.

It is an object of the present invention to provide a remote unit that can interface plural types of sensors.

It is also an object of the present invention to provide separate communication channels for each remote unit.

It is an additional object of the present invention to allow plural low speed analog signals to be multiplexed.

It is a further object of the present invention to provide a low cost remote unit that takes advantage of medium scale integration.

It is still another object of the present invention to allow asynchronous data collection.

It is an object of the present invention to allow each remote unit to be flexibly assigned different channel frequencies for communication.

It is an additional object of the present invention to allow easy addition of remote units.

The above objects can be attained by a multinode system that transmits power down a common bus coaxial cable typically using an alternating current power source. Each remote unit connected to the coaxial cable converts the alternating current power to direct current power for an integrated circuit bus interface. The interface is externally pin programmable to provide a carrier at a frequency for a channel assigned to the remote unit thereby providing each remote unit with an individual identity. When plural low frequency analog signals are to be transmitted over the common bus an on-chip multiplexer multiplexes the signals to an offchip, external analog-to-digital converter. The analog-to-digital converter loads an on chip parallel-to-serial out shift register that applies each bit of the digitized signal serially to an on chip Manchester encoder. The encoder modifies the input voltage of an on chip voltage controlled oscillator operating at the carrier frequency. The modulated frequency oscillator signal is applied to the coaxial cable. Receivers at the end of the coaxial cable can be tuned to the designated carrier frequencies to demodulate and then decode the encoded signal at any time. If a high frequency analog signal is supplied, it is used to directly modify the voltage applied to the voltage controlled oscillator, that is, the carrier frequency is modulated by the high frequency signal and the receiver operating at the carrier frequency demodulates the signal. The integrated circuit is arranged so that the digital circuitry is generally isolated from and on the opposite side of the chip from the analog circuitry so noise immunity is enhanced. The digital and analog circuitry have separate power supplies. The circuit is arranged in a carrier so that critical lead wire runs are held to a minimum.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3, including

FIG. 7, including

FIG. 11, including

FIG. 14, including FIGS. 14A and 14B, depicts the timing diagram for the integrated circuit 30, particularly illustrating the timing relationship to the external analog-to-digital converter 48 of FIG. 2;

FIG. 16, including

FIG. 21, including

FIG. 24, including

FIG. 27, including FIG. 28, including

DESCRIPTION OF THE PREFERRED EMBODIMENTS

Figure 1:
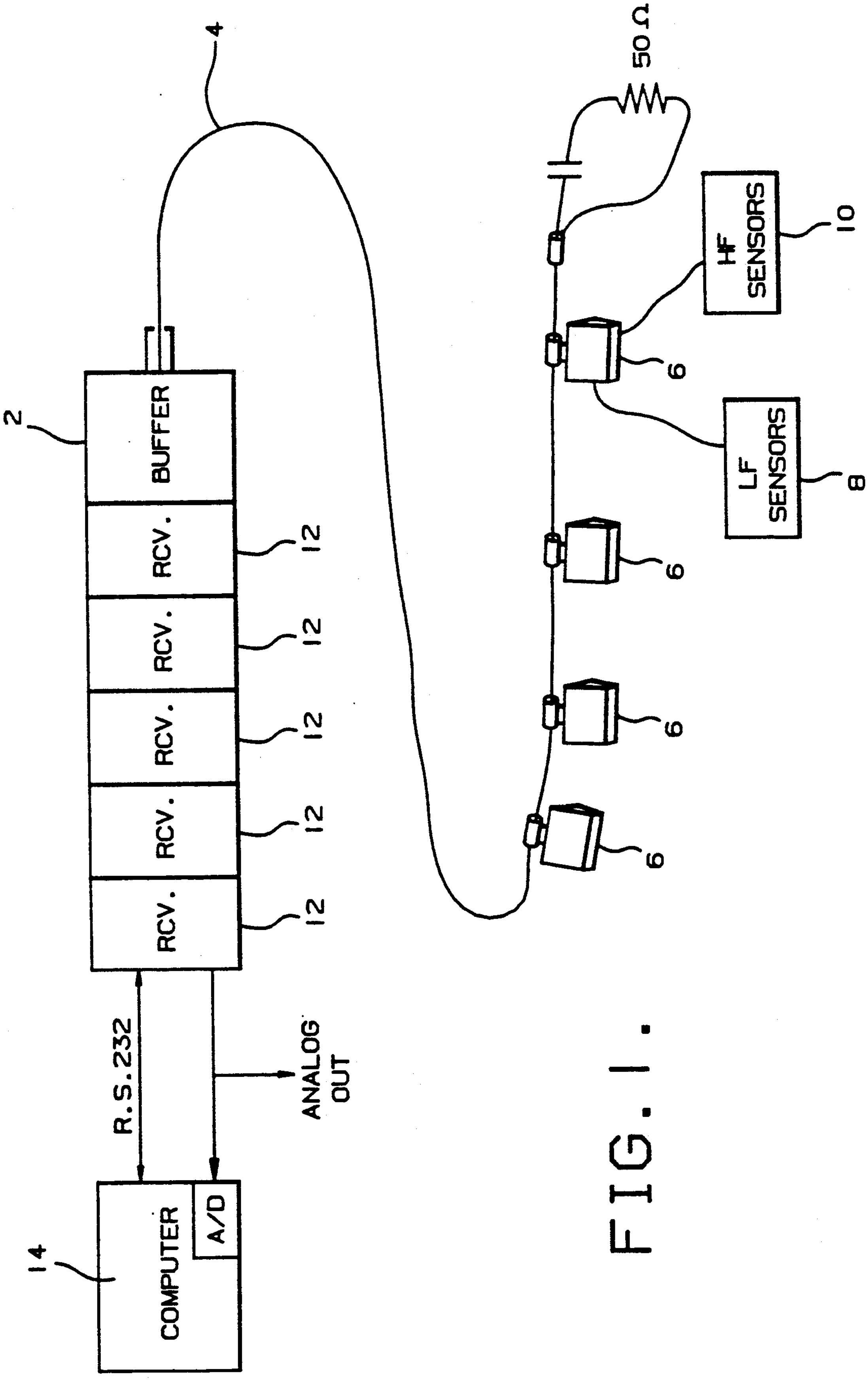
FIG. 1 illustrates a multinode system in accordance with, the present invention.

The present invention provides an improved sensor system that allows up to 128 remote sensor units to asynchronously and simultaneously transmit data over a common coaxial cable to a distantly located receiver and computer and receive power via the same cable. A buffer board 2, as illustrated in FIG. 1, preferably supplies alternating current power to a coaxial cable 4 which has remote units 6 attached thereto, however, the power supplied could be direct current. The cable can be a standard $\frac{1}{4}\pi$or $\frac{1}{2}$ inch 50 ohm cable. Each of the remote units 6 converts the alternating current power carried by the coaxial cable 4 to direct current to power an analog serial bus interface and other node components. The interface integrated circuit can sample low frequency sensors 8, encode the sensor signals and transmit same over the coaxial cable 4 on a designated frequency channel. Each remote unit 6 is assigned a different carrier frequency. The interface can also transmit signals from a high frequency sensor 10 over the cable 4 in the designated channel. The frequency division multiplexed signal produced by each remote sensor unit 6 is demodulated by an appropriate receiver 12 which can be tuned to the designated channel frequency. If the sensor signals have been encoded, the respective receiver 12 also decodes the sensor signals and supplies same to the computer 14. The computer 14 would normally be a sophisticated, high speed process control type machine, however, a simple IBM PC is acceptable. If the high frequency sensor signal is transmitted by the remote unit 6, the respective receiver 12 produces same as analog output signal.

Figure 2:
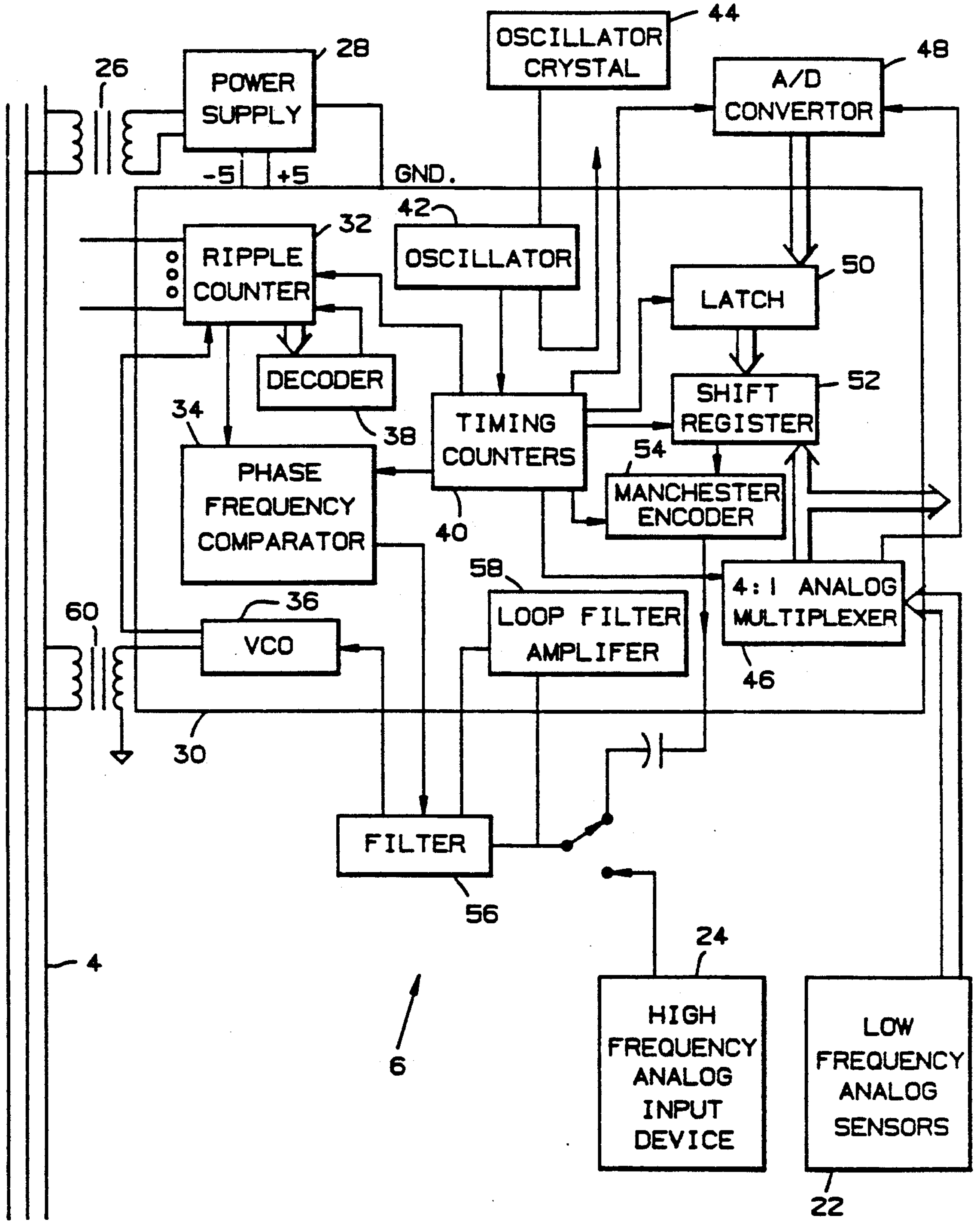
FIG. 2 illustrates the components of one of the remote/units 6 of FIG. 1.

As illustrated in FIG. 2, a common transformer 26 couples the alternating current, at, for example, 28 volts and 60 Hz, to a power supply 28 which converts the alternating current into positive and negative direct current supplied to an analog serial bus interface integrated circuit 30. The transformer 26 also provides isolation preventing the failure of a single node from knocking out the entire system. The power supply is a common power supply which will convert a 60 cycle 28 volt signal into plus 5 volt, minus 5 volt and ground direct current sources and supply at least 100 milliwatts, the minimum necessary for the interface 30, but preferably at least one watt so that other circuits and sensors can be adequately powered. It is also possible to construct a simple power supply from two diodes, two capacitors and three terminal regulators available from National Semiconductor as described in the National Semiconductor Linear Databook, 1982, in the application hints on pages 1-20.

The interface 30 includes a ripple counter 32 which receives a multibit frequency designation word from programming pins external to the chip 30. The multibit frequency designation word designates the carrier frequency assigned to the particular remote unit 6. The ripple counter 32 is reloaded with the frequency selection word from the external pins each time the decoder 38 detects a count of zero. The phase/frequency comparator 34 compares the ripple counter carry out signal to a reference frequency of approximately 44.7 kilohertz from timing counters 40. The timing counters 40 also produce timing signals for other devices on the chip 30. The timing counters 40 are driven by an oscillator 42 connected to an external oscillator crystal 44 such as a TV crystal which oscillates at approximately 3.5 megahertz. The ripple counter 32, decoder 38, phase/frequency comparator 34, voltage controlled oscillator 36, timing counters 40 and oscillator 42 create a programmable frequency synthesizer that operates off of a crystal reference such as the T.V. crystal.

The timing counters 40 also control the multiplexing of low frequency analog sensors 22 by an analog multiplexer 46. The analog multiplexer 46 provides the analog signals from one of the sensors 22 to an external analog-to-digital converter 48 available from G.E. Intersil as a 7109 converter. The sample rate of the converter 48 is controlled by a timing signal from the timing counters 40. When the analog-to-digital converter 48 has converted the selected analog signal, the digital value thereof is stored in latch 50. When the prior contents of shift register 52 have been shifted out the contents of latch 50 as well as a two bit address from the analog multiplexer 46 are loaded in parallel into the shift register 52. The two bit address from the multiplexer 46 indicates which of the four analog signals is currently being sampled. The shift register 52 then serially outputs its contents to a Manchester encoder 54. The Manchester encoder 54 modifies the voltage produced by a filter 56 applied to the voltage controlled oscillator 36. The chip 30 also includes a loop filter amplifier 58 is used for filtering out high frequency components.

During operation the phase/frequency comparator 34 drives the voltage produced by the filter 56 upward whenever the voltage controlled oscillator 36 is producing a frequency lower than the carrier frequency and drives the voltage downward whenever the voltage controlled oscillator frequency is higher than the carrier frequency, and tends to track the carrier frequency designated by the inputs to the ripple counter 32. As a result, the Manchester encoder 54 is frequency shift keying the signal produced by the voltage controlled oscillator 36 by raising or lowering the voltage produced by the filter 56 in dependence upon the signal output by the Manchester encoder 54. The output of the voltage controlled oscillator 36 is coupled to the coaxial cable 4 through a transformer 60. The transformer should be a high frequency transformer capable of operating in the 6 to 12 megahertz frequency range. Such a transformer can be constructed by winding several turns of wire around a ferrite core and providing an isolation resistor of 5k ohms.

As can be seen from the above discussion, the interface chip 30 encodes the analog signals and modulates a carrier frequency therewith. As a result, it is possible for the chip 30 to sample and transmit the values for four low frequency analog sensors 22. If a high frequency analog input signal, such as a signal from a piezosensor, (up to 20 kHz with a dynamic range of 70 dB) is to be transmitted, the high frequency signal directly modulates the voltage produced by filter 56 so that the output of the voltage controlled oscillator 36 is a carrier frequency modulated by the high frequency analog input signal. When a signal with a frequency higher than 20 kHz is being transmitted, it will occupy more than a single channel of bandwidth, as a result, it is necessary to leave adjacent channels empty.

It is also possible for the chip 30 to interface the values from digital sensors by substituting the outputs of the digital sensors for the input signals from the analog-to-digital converter 48. In this manner, at least 13 binary sensors can be sampled every 133 milliseconds. Thus, the interface chip 30 of FIG. 2 is capable of operating in at least four different modes: 1) low frequency analog; 2) high frequency analog; 3) digital data from one or more digital sensors; and 4) digital data from the external A/D 48.

Figure 3A:
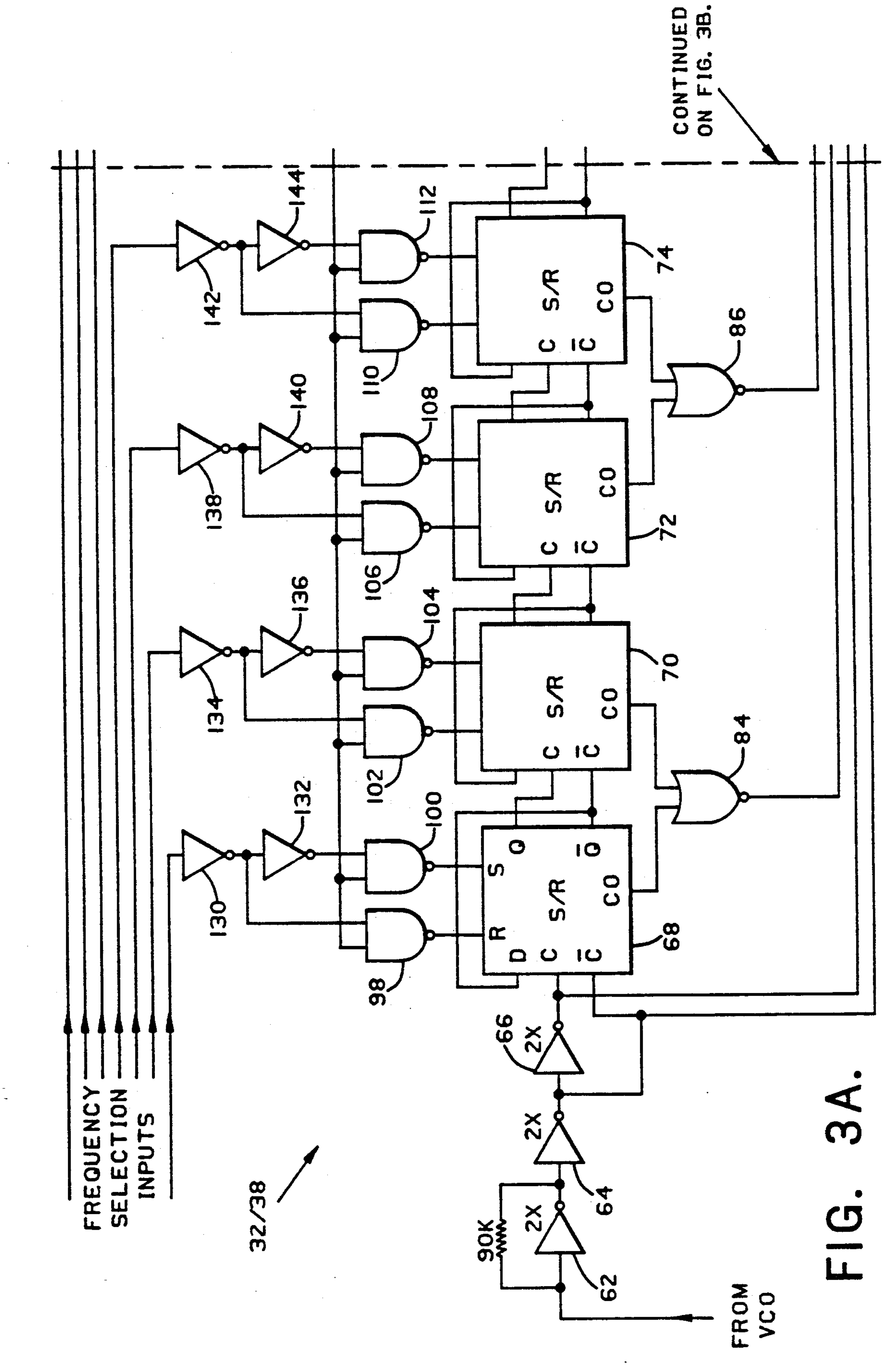
FIGS. 3A and 3B, illustrates the ripple counter 32 and decoder 38 of FIG. 2.
Figure 3B:
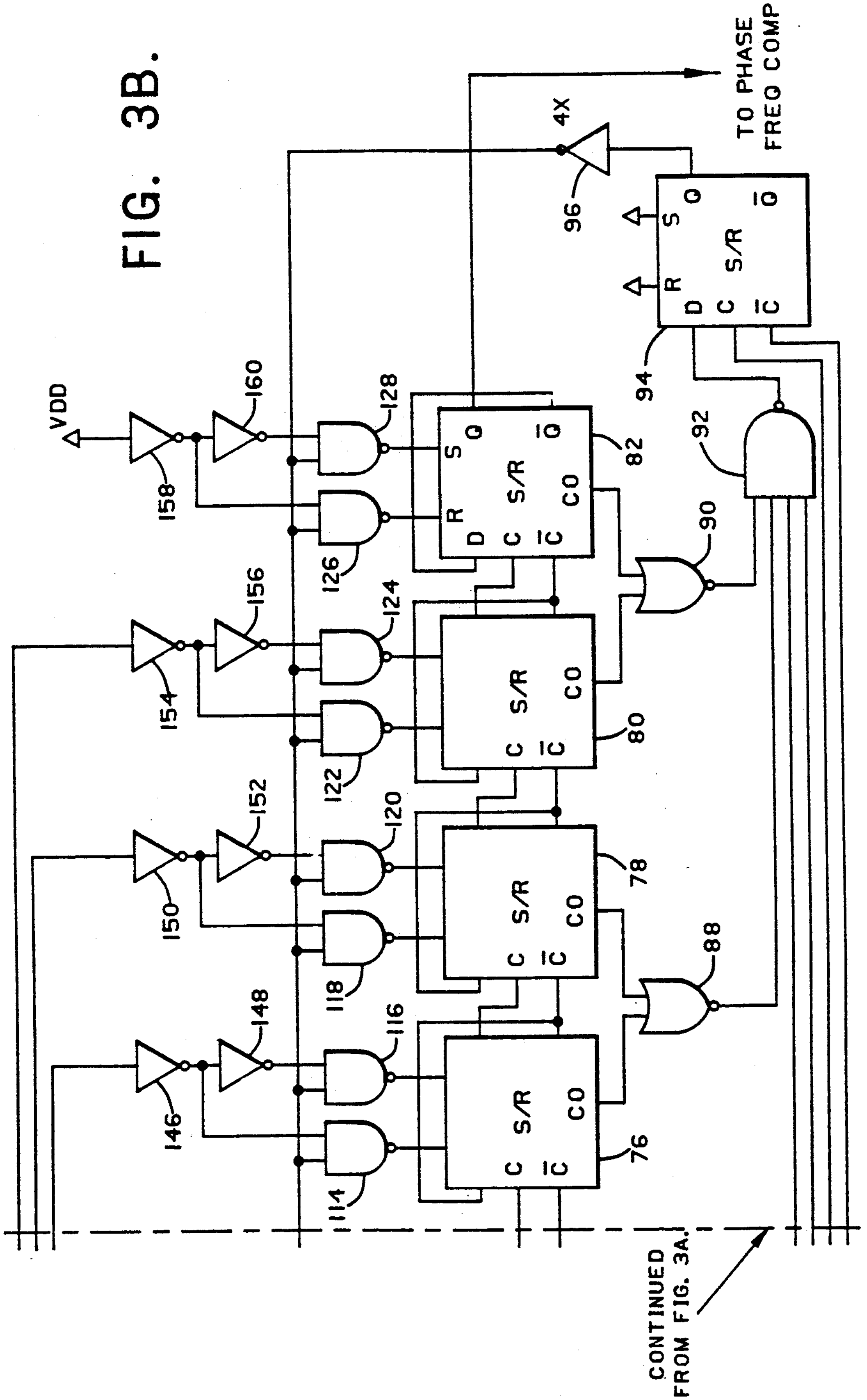

The ripple counter 32, as illustrated in FIG. 3A and 3B, is driven with a clock signal from the voltage controlled oscillator 36. The clock signal passes through three buffers 62–66 (FIG. 3A) where the lettering next to each buffer (2X) indicates the sizing of the transistors in the buffer. The ripple counter 32 down counts the contents thereof where each set/reset flip-flop is clocked by the output from the previous stage. As the counter 32 is down counted, the output from the last stage flip-flop 82 (FIG. 3B) is applied to the phase/frequency comparator 34. When the content of the counter 32 equals zero, all of the carryout (CO) lines are at a 0 logic level, resulting in the outputs of the NOR gates 84–90, which are part of decoder 38 producing a logic 1 level. When all of the inputs to NAND gate 92 (FIG. 3B) of the decoder 38 are high, set/reset flip-flop 94 produces a load signal at the next clock signal which loads counter flip-flops 68–82 with the frequency selection count supplied from the external chip pins through inverters 130–160 and NAND gates 98–128.

Figures 4, 12:
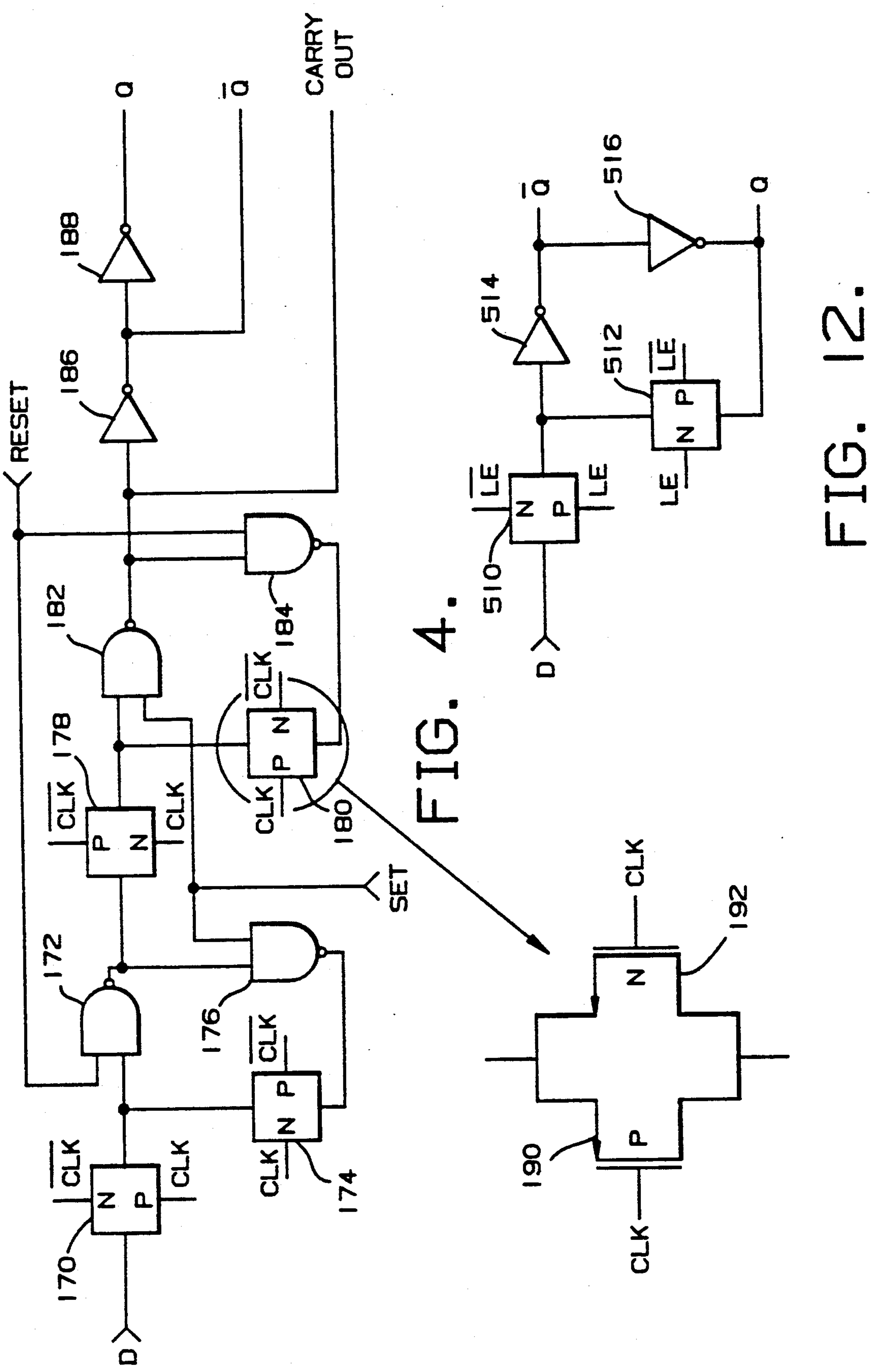
FIG. 4 illustrates one of the reset flip-flops of FIG. 3.
FIG. 12 illustrates the details of the single bit latches of FIG. 11.

FIG. 4 illustrates the details of construction of each of the set/reset flip-flops 68–82 of FIG. 3. A T-switch 170 (transmission switch) supplies a NAND gate 172 with the D input. The gate 172 also receives the reset signal and a signal from switch 174. The switches 170 and 174 are activated with the clock signal. The gate 172 outputs to both switch 178 and gate 176. The set input is connected to gate 176 and gate 182. Gate 182 receives an input from either switch 178 or gate 182. Gate 182 produces an output through buffers 186 and 188 and supplies a signal to gate 184. Gate 184 also receives the reset input.

Figure 5:
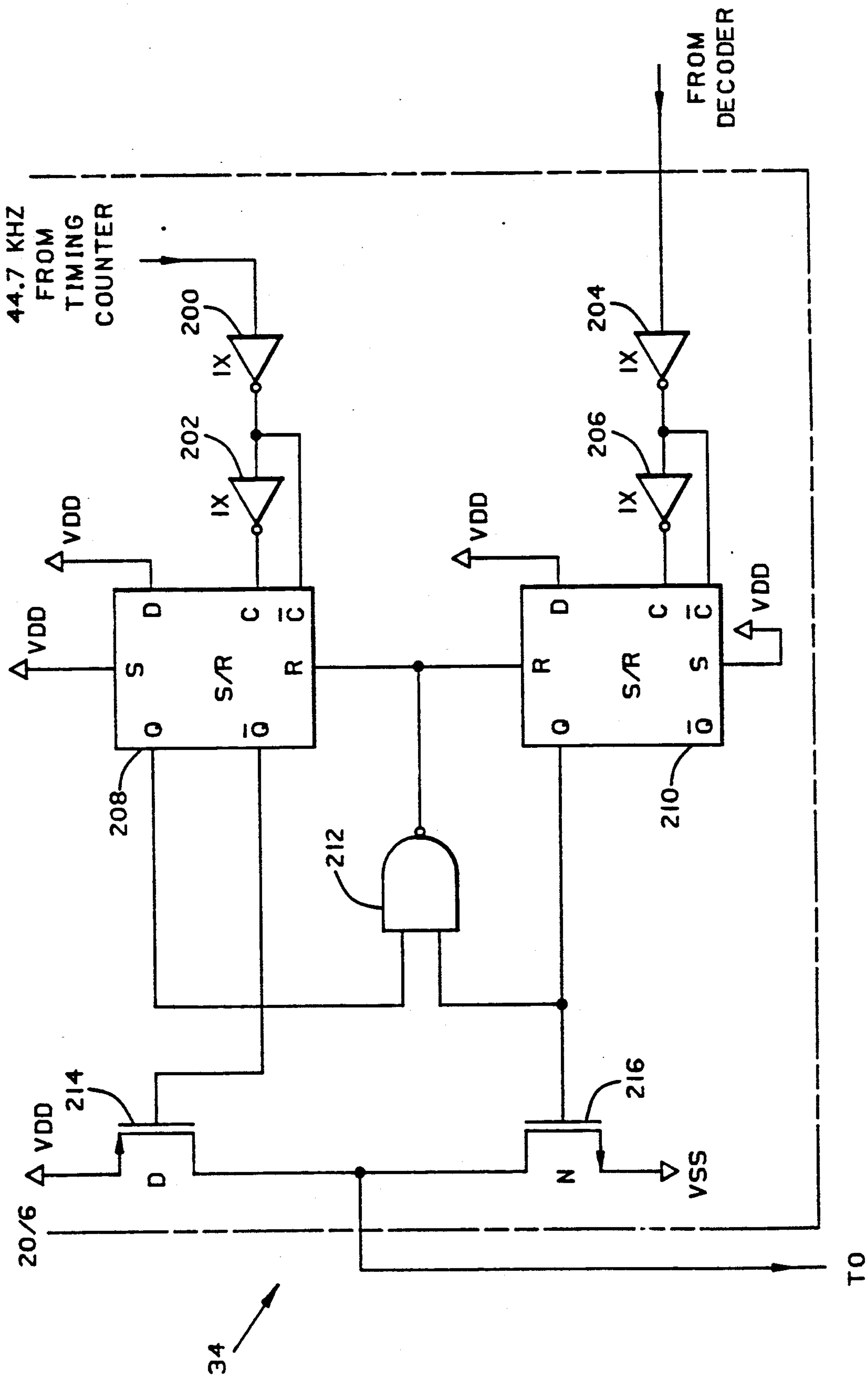
FIG. 5 illustrates the details of the phase/frequency comparator 34 of FIG. 2.

The output from the counter 32 is applied to the phase/frequency comparator 34 of FIG. 5 along with a reference signal from the timing counter 40. The compared signals are applied to the clock inputs of the set/reset flip-flops 208 and 210 through signal buffers 200–206. When the flip-flops are being clocked at a constant ratio with respect to each other, the NAND 212 resets each flip-flop at the same ratio. When the outputs of the flip-flops are being clocked at the same ratio, the transistors 214 and 216, on the average, produce a constant voltage level at the junction therebetween. Whenever one flip-flop is being clocked at a changing frequency as compared to the other flip-flop, the average voltage produced by transistors 214 and 216 changes. Whenever the counter signal is slowing down, as compared to the reference signal, the output voltage produced by the phase/frequency comparator 34 rises. The rise in the output voltage, after a delay, causes the output voltage produced by the filter 56 to rise, thereby causing the voltage controlled oscillator 36 to move to a higher frequency. Whenever the ratio is falling, that is, the decoder signal is rising in frequency with respect to the reference signal, the voltage produced by the frequency phase/comparator 34 falls, thereby slowing the voltage controlled oscillator 36.

Figure 6:
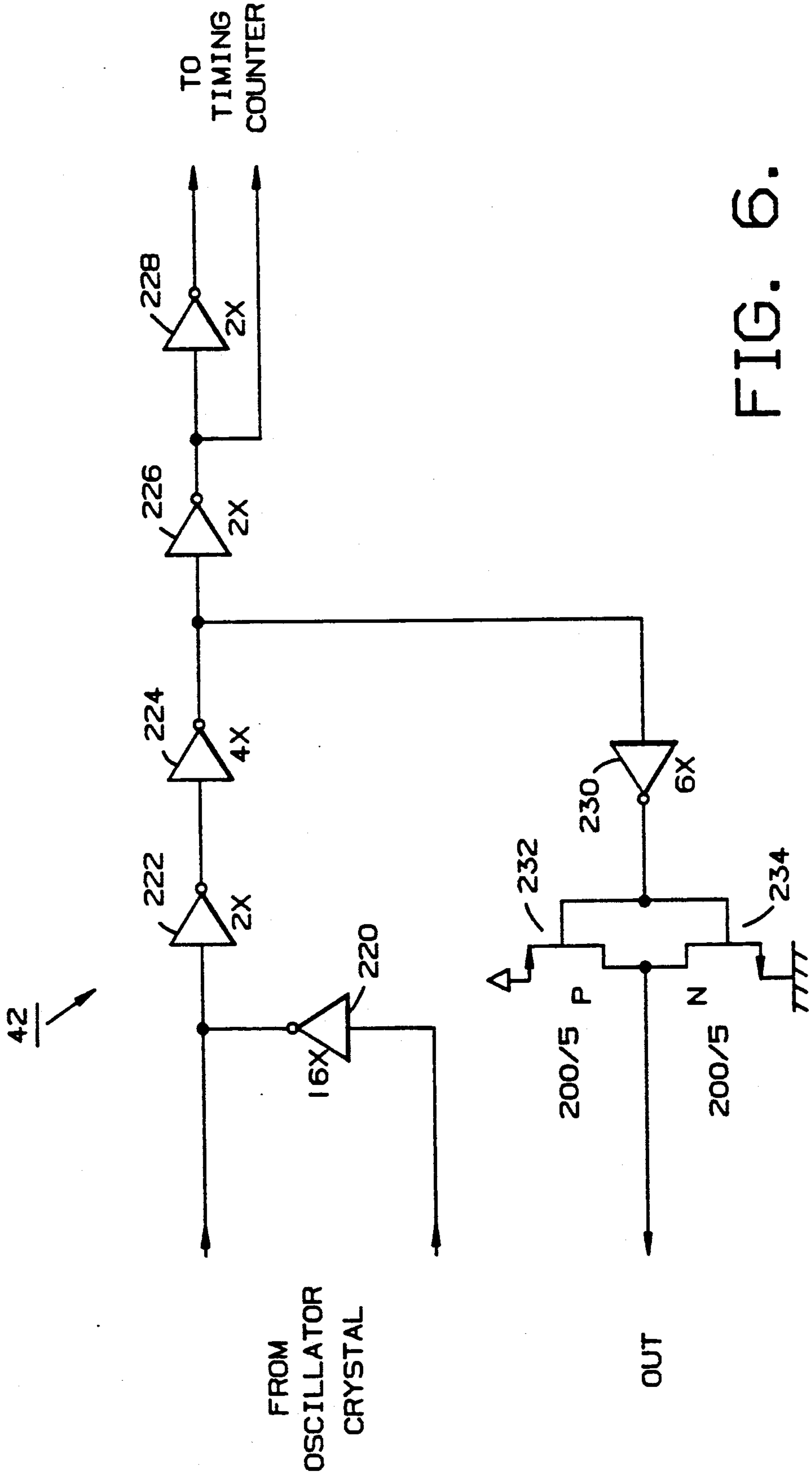
FIG. 6 illustrates the details of the oscillator 42 of FIG. 2.

The oscillator 42 of FIG. 6 is connected to the oscillator crystal 44 which is off the chip 30 and which can be a TV crystal available from CTI as Model PTI1633. The crystal signal is supplied through buffers 220–228 to the input of the timing counters 40. In addition, the output of the oscillator 42 is supplied external to the chip 30 through a buffer 230 and transistor 232 and 234. The numbers adjacent to transistors 232 and 234 indicate the sizing of the transistors necessary to produce an acceptable output that can be monitored by external circuits.

Figure 7A:
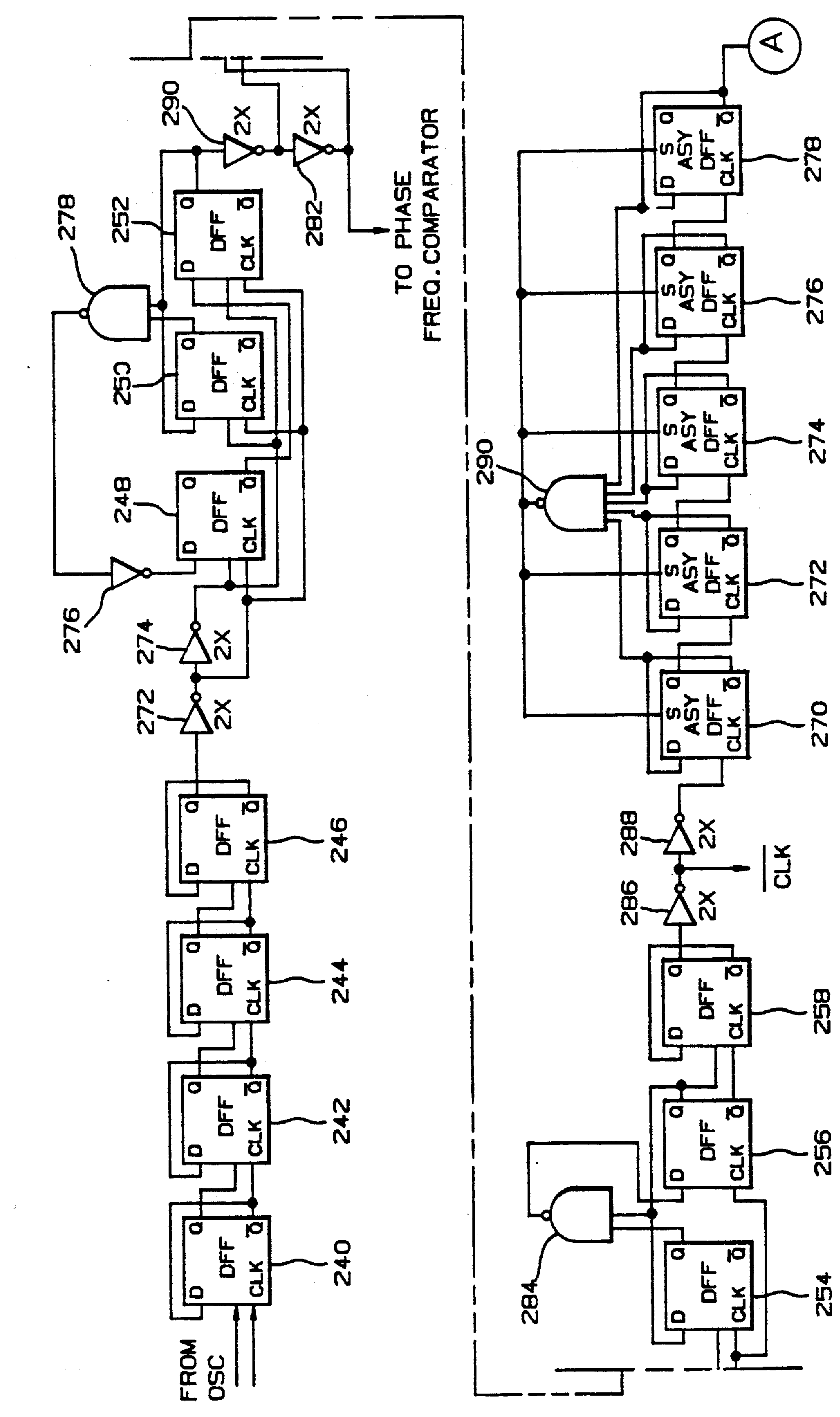
FIGS. 7A and 7B, illustrates the details of the timing counters 40 of FIG. 2, including timing signal buffers.
Figure 7B:
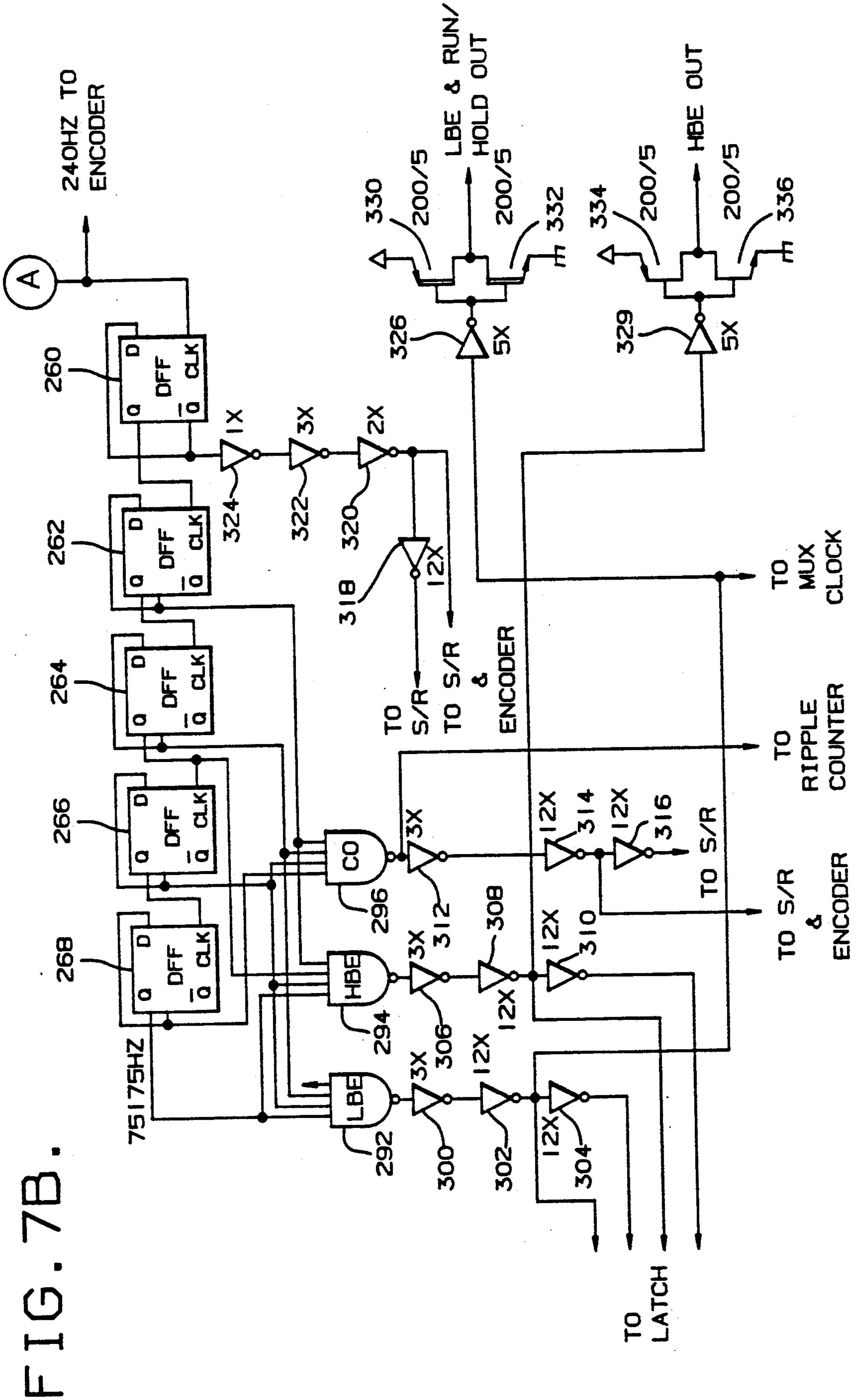

The timing counters 40 include synchronous D flip-flops 240–268 and asynchronous set D flip-flops to 270–278, as illustrated in FIGS. 7A and 7B. The flip-flops have buffers and NAND gates 272–290 connected thereto which provide appropriate signal levels and set the division rate for each stage. The first stage (FIG. 7A), including flip-flops 240–246 is a divide by sixteen stage, the second stage, including flip-flops 248–252 is a divide by five stage, the third stage, including flip-flops 254–258 is a divide by six stage, the fourth stage, including flip-flops 270–278 is a divide by thirty-one stage and the last five stages (FIG. 7B), including flip-flops 260–268, are each divide by two stages. The outputs of the last four stages are applied to NAND gates 292–298 to produce the clock signals for the circuits as indicated. (See also the timing diagram of FIG. 14). The outputs produced by the NAND gates 292–298, as well as the flip-flops, are buffered by buffers 300–324, so that appropriate signal driving levels can be provided. In addition, the outputs of the high byte enable 294 and low byte enable 292 gates are provided through buffers 326 and 328 and transistors 330–336 to the external pins of the chip 30.

Figure 8:
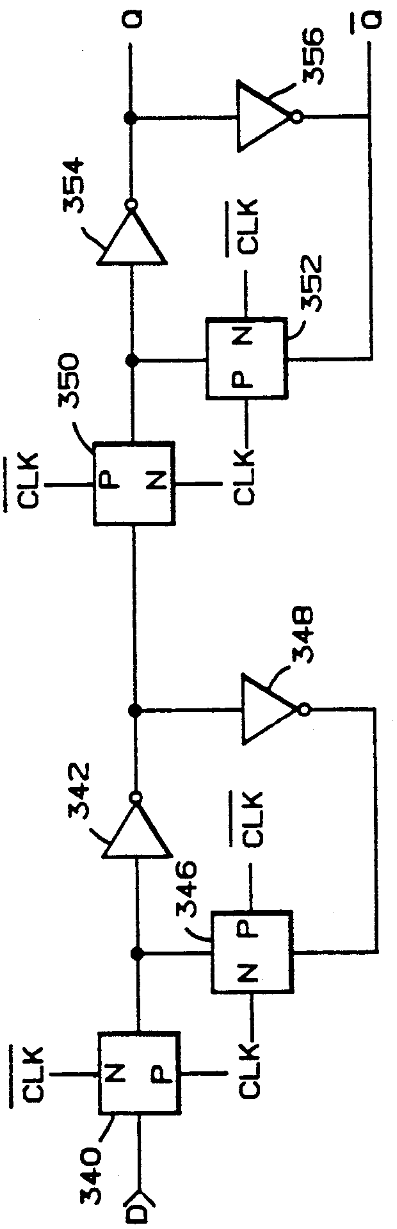
FIG. 8 illustrates one of the D flip-flops of FIG. 7.

FIG. 8 illustrates the construction of the D flip-flops 240–268. The D flip-flops each include a T-switch 340 receiving the D input. The switch 340 supplies buffer 342 which is also supplied by switch 346. The output of buffer 342 is applied to buffer 348 and switch 350. The output of switch 350 is supplied to output switch 354 which is fed back through buffer 356 to switch 352.

Figure 9:
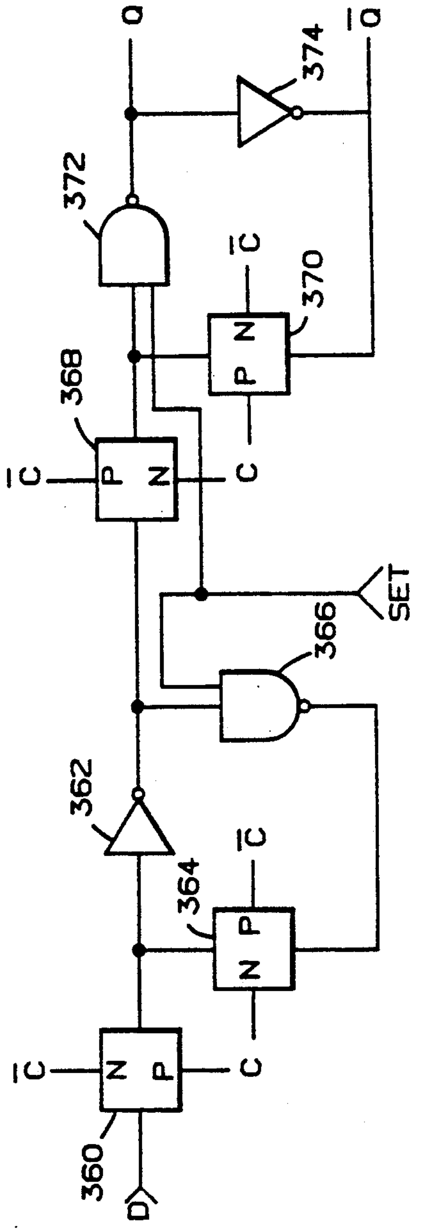
FIG. 9 illustrates one of the asynchronous set D flip-flops of FIG. 7.

FIG. 9 illustrates the construction of the asynchronous set D flip-flops 270–278. The asynchronous set D flip-flops each have a construction very similar to the flip-flop of FIG. 8. T-switch 360 receives the D-input and supplies buffer 362 which is also fed by switch 364 via NAND gate 366. The gate 366 receives the set input which is also applied to gate 372. Gate 372 receives another input from switch 368 and produces an output that is fed back through buffer 374 and switch 370.

Figure 10:
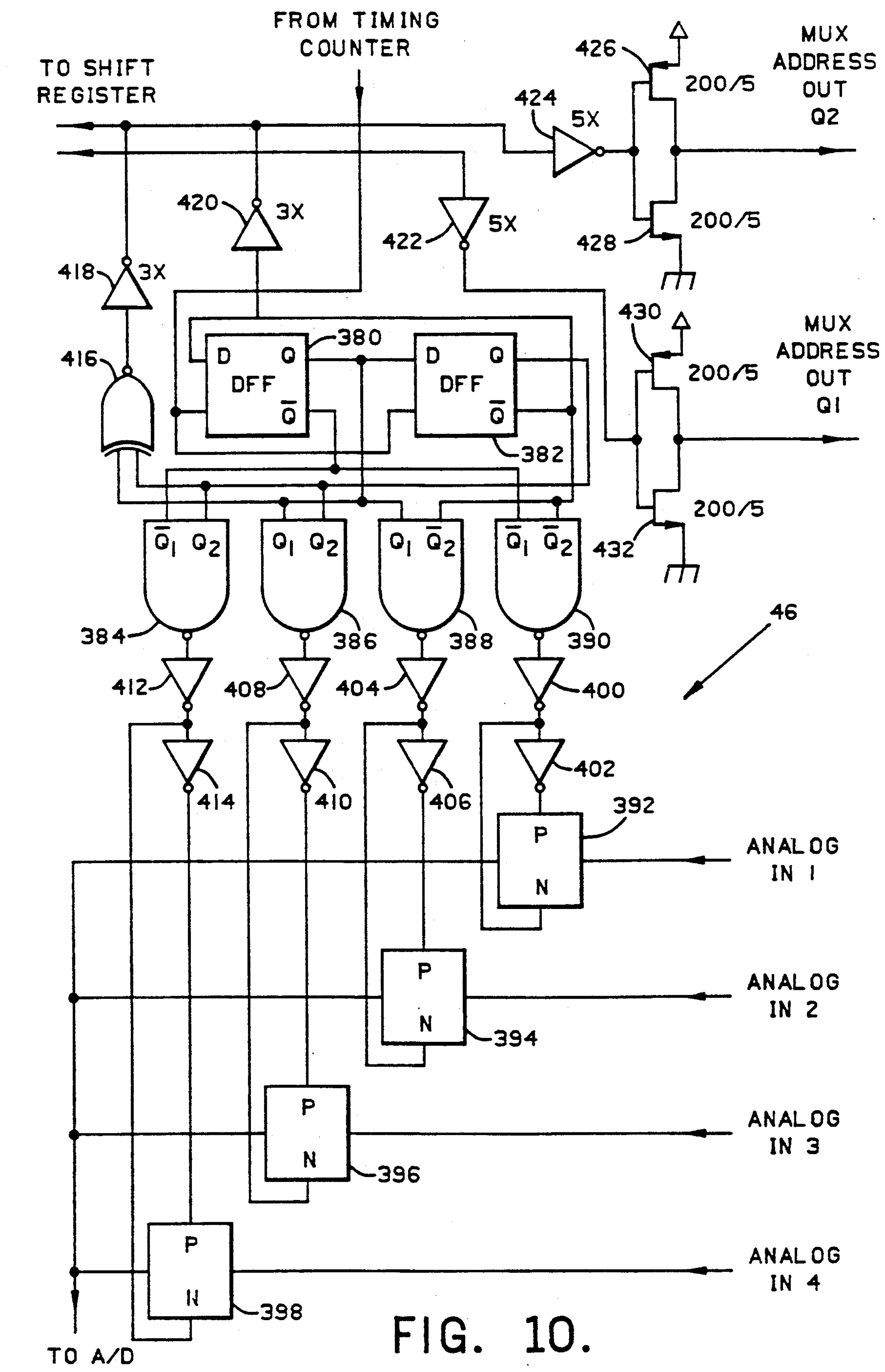
FIG. 10 depicts the details of the analog multiplexer 46 of FIG. 2.

One of the outputs from the timing counters 40 is provided to the 4 to 1 analog multiplexer 46 illustrated in FIG. 10. The timing signal provided to the multiplexer 46 is oscillating at a frequency of 7.517 Hz, producing windows approximately 133 ms wide, resulting in a complete cycle every 532.1 ms for four conversions. The timing counter signal is applied to D flip-flops 380 and 382 which control NAND gates 384–390. The gates 384–390 produce switching signals which control T-switches 392-398 through buffers 400–414. The multiplexer 46 also provides an address to the shift register 52 which indicates which analog input is currently being output. One bit of the.address is produced by exclusive OR gate 416 while the other bit is produced by flip-flop 382. That is, the grey code of the multiplexer is converter to a two bit binary address output. The address signals are buffered by buffers 418–424 which indicate appropriate sizing. The address supplied to shift register 52 is also supplied as an output of the chip 30 through transistors 426–432. If one of the inputs to the analog multiplexer 46 is connected to ground and/or to a predetermined voltage the system can provide automatic calibration.

Figure 11A:
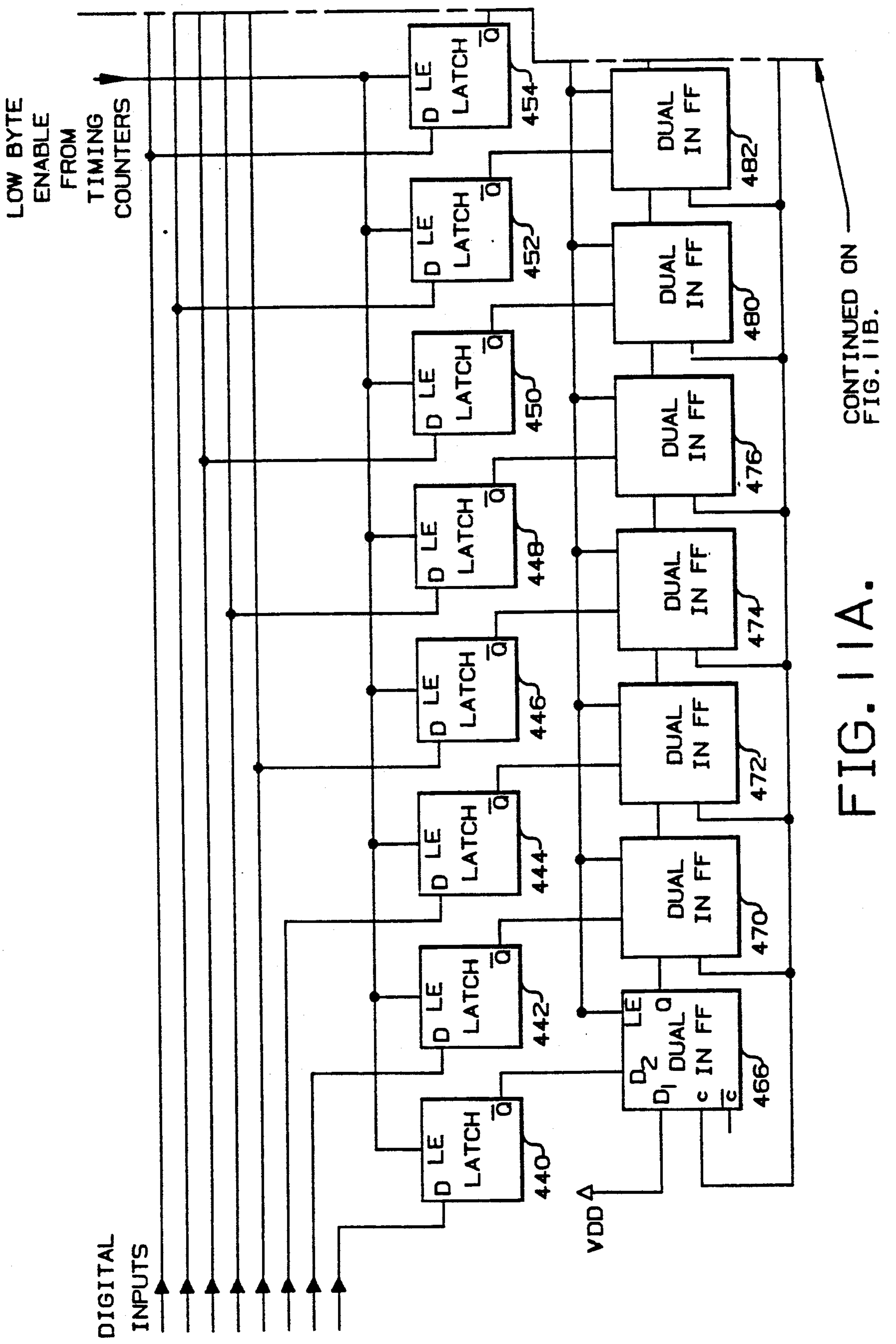
FIGS. 11A and 11B, illustrates the details of the latch 50 and shift register 52 of FIG. 2.
Figure 11B:
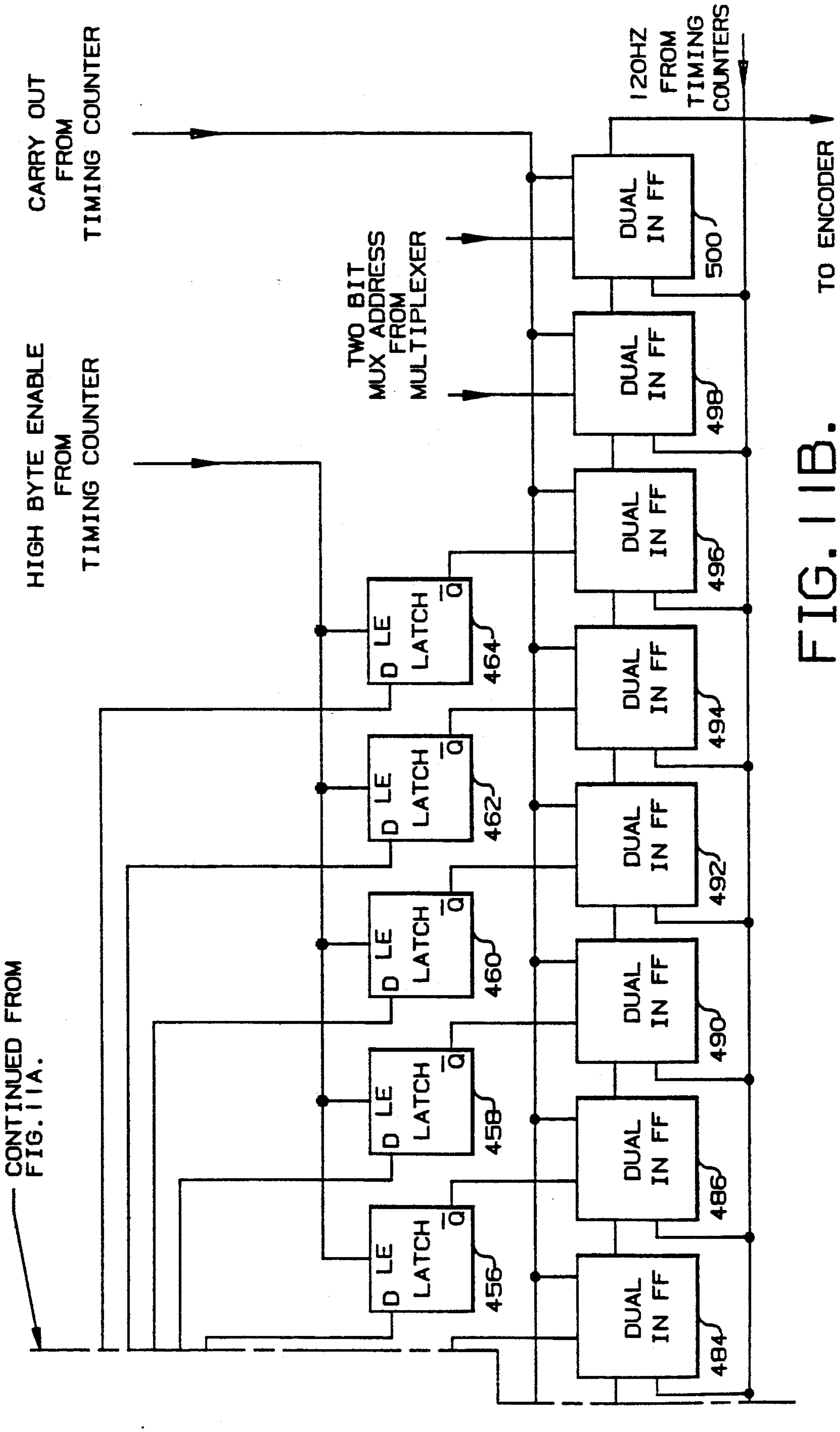

When the A/D converter 48 has converted a single analog input sample, the sample is loaded into the latches 440–464 illustrated in FIGS. 11A and 11B one byte at a time. That is, the timing counter 40 provides a low byte enable signal to latches 440–454 which loads the low byte of the sample and a high byte enable signal which subsequently loads the upper five bits of the conversion into latches 456–464. When the latches 456–464 have been loaded, register load signals from the timing counters 40 load the contents of the latches 440–464, as well as the address bits from the multiplexer 46 into dual input D flip-flops 466–500. Once the flip-flops 466–500 are loaded, a clock signal, at a frequency of 120.28 Hz, from the timing counters 40 clocks the contents of the flip-flops flops 466–500 serially to the Manchester encoder 54.

The details of construction of each of the single bit latches 440–464 of FIG. 11 are illustrated in FIG. 12. Each single bit latch includes a T-switch 510 receiving the input and supplying same to a buffer 514. The output of buffer 514 is fed back through buffer 516 and switch 512.

Figure 13:
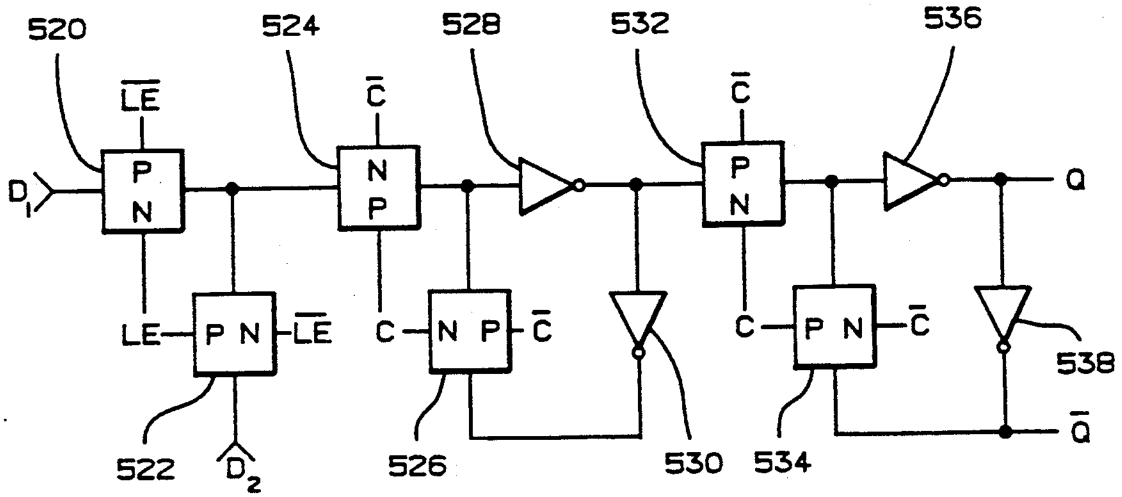
FIG. 13 depicts the dual input D flip-flop of FIG. 11.

The details of construction of each of the dual input D flip-flops 466–500 of FIG. 11 are illustrated in FIG. 13. The dual input flip-flops receive one input through a T-switch 520 and the other input through switch 522. Both switches 520 and 522 supply switch 524. The output of switch 524 is applied to switch 528 and fed back through buffer 530 and switch 526. The outputs are produced by switch 532 through buffers 536 and 538. Switch 534 feeds back the inverted output.

Figure 14A:
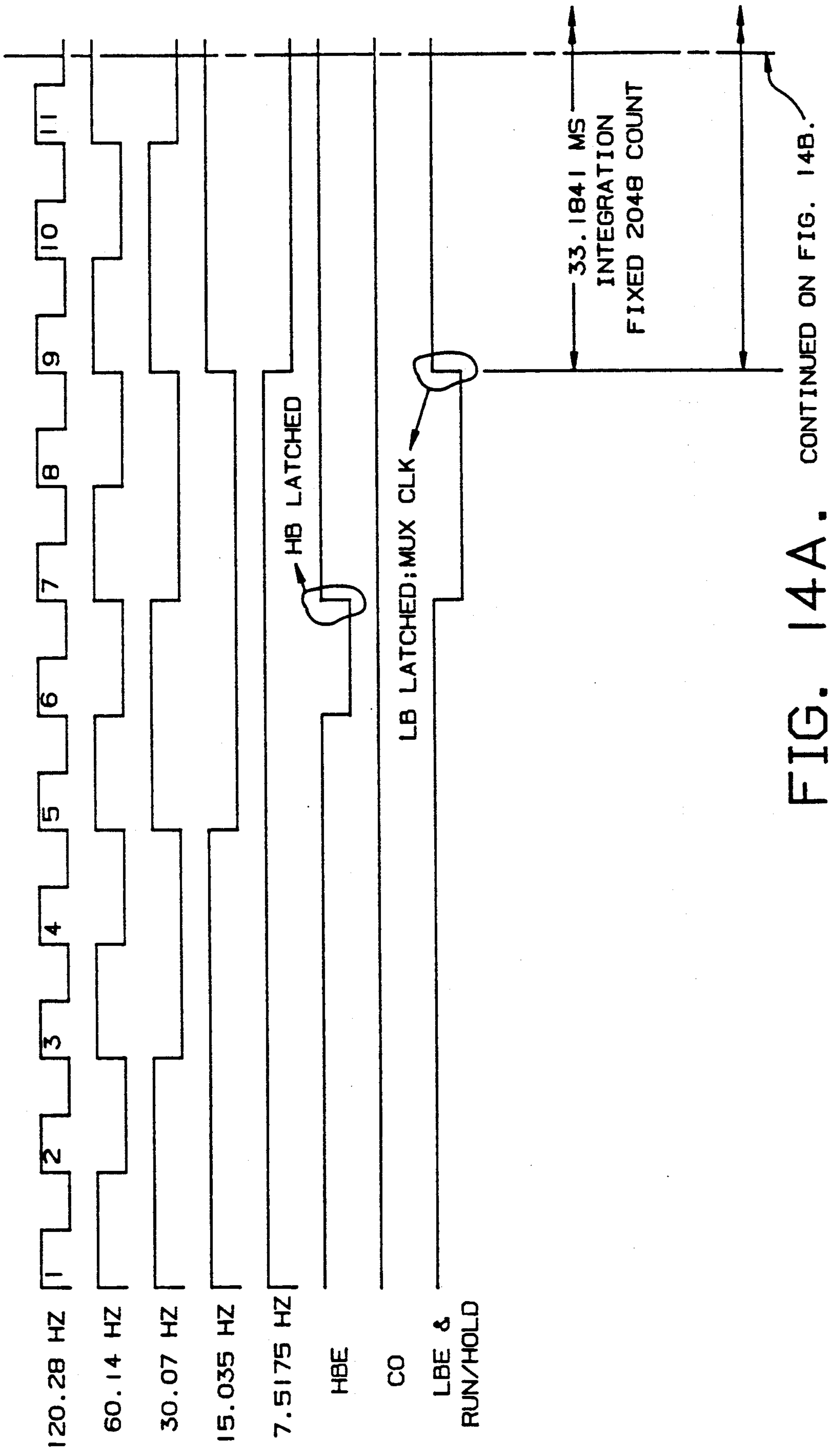

The timing associated with the sampling by the analog-to-digital converter 48, loading of the sample into the latches 440–464, transfer from the latches 440–464 to the shift register flip-flops 466–500 and the clocking of the samples serially to the encoder 54 is illustrated in FIG. 14. The top waveform indicates the clocking of the bits from the shift register 52 into the encoder 54 where the number within the waveform indicates the particular data bit being clocked. After the high byte and low bytes have been enabled (FIG. 14A) the digital-to-analog converter 48 begins an integration period followed by a deintegration period (FIG. 14B). During the deintegration period, the shift register 52 is loaded with the previous sample stored by the latch 50. This load enable corresponds to a dead period in the serial transmission of the shift register bits to the encoder 54. Near the end of the deintegration period, a valid data period starts during which the high and low bytes from the converter 48 are stored in the latch 50. Before a new integration cycle occurs, a delay is seen at the A/D converter 48 when using the RUN/HOLD as the clock. The delay period is approximately 113 microseconds after the low byte is latched and the multiplexer 46 is clocked.

Figure 15:
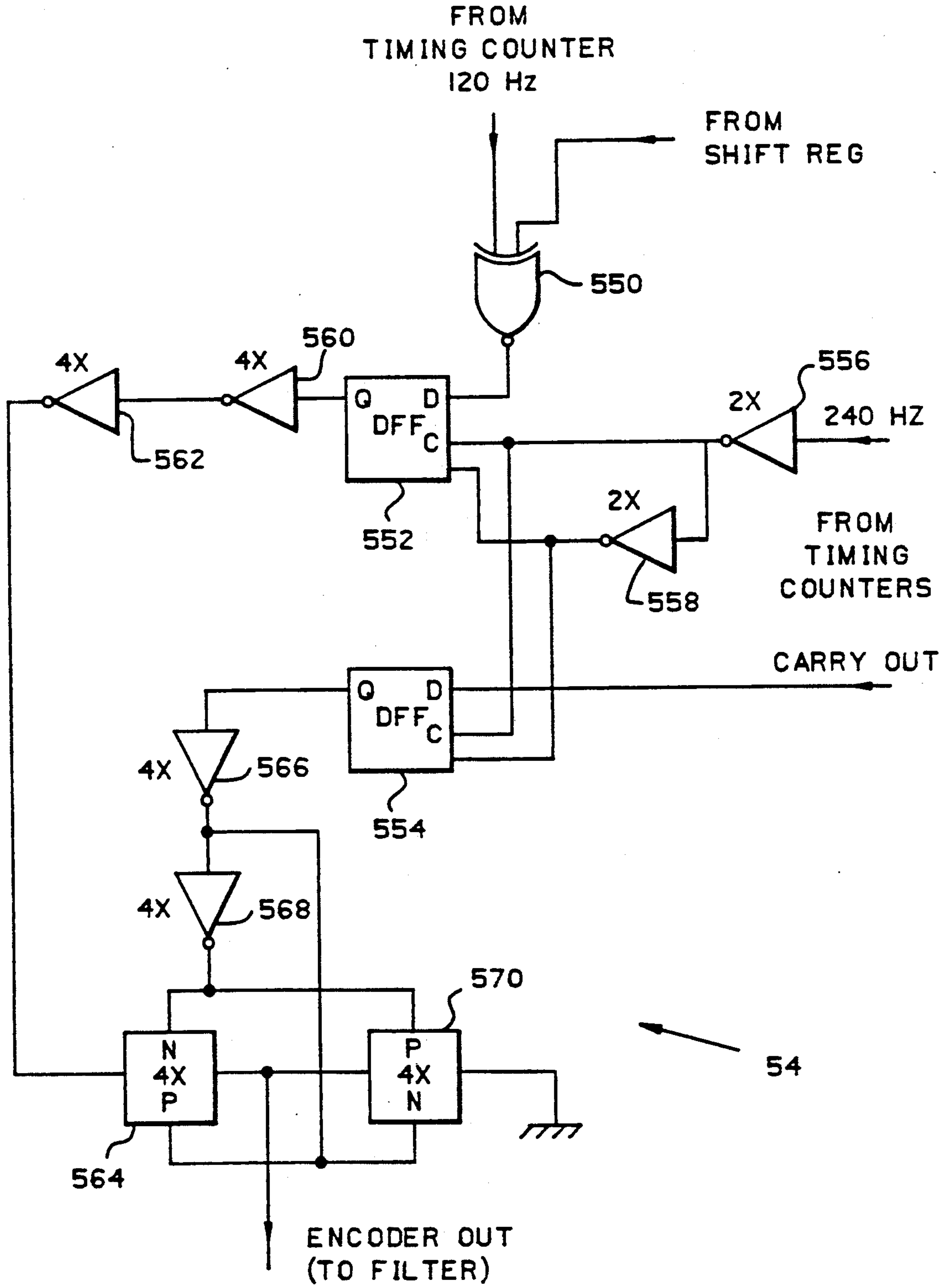
FIG. 15 illustrates the details of the Manchester encoder 54 of FIG. 2.

The serial bits from the shift register 52 are applied to an exclusive OR gate 550 in the Manchester encoder 54, illustrated in FIG. 15. The other input of the gate 550 receives a 120 hertz timing signal from timing counters 40. The output of gate 550 is applied to a D flip-flop 552, the construction of which is illustrated in FIG. 8. The clock signals for D flip-flop 552 and D flip-flop 554 are supplied from the timing counters 40 through buffers 556 and 558 at 240 Hz. The output of flip-flop 552 is applied to an output line through buffers 560 and 562 and T-switch 564. The output of flip-flop 554 is applied through buffers 566 and 568 controls the switch 570 is applied to and one control input of T-switch 564.

Figure 16A:
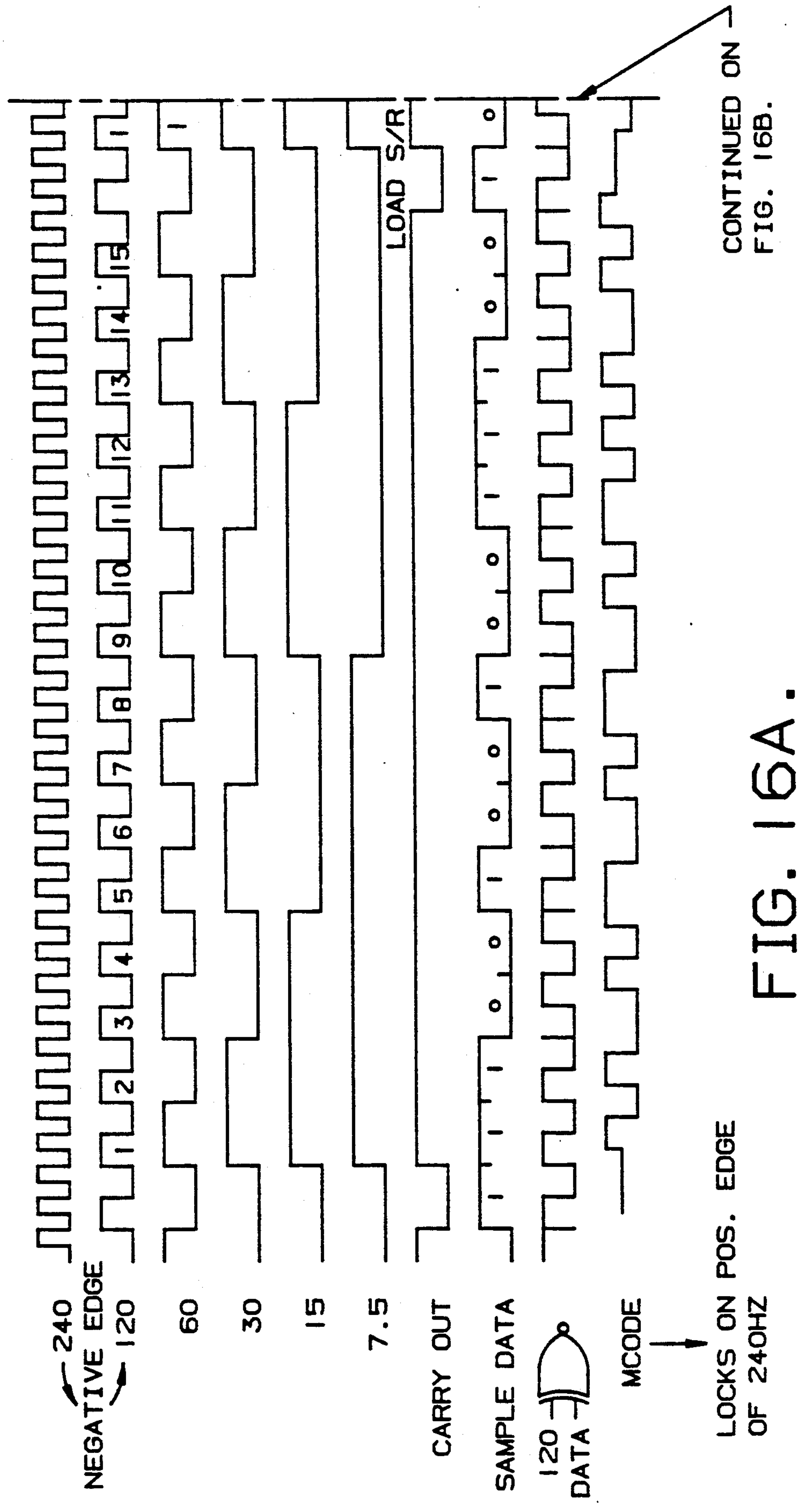
FIGS. 16A and 16B, illustrates the timing of the Manchester encoder for example data.
Figure 16B:
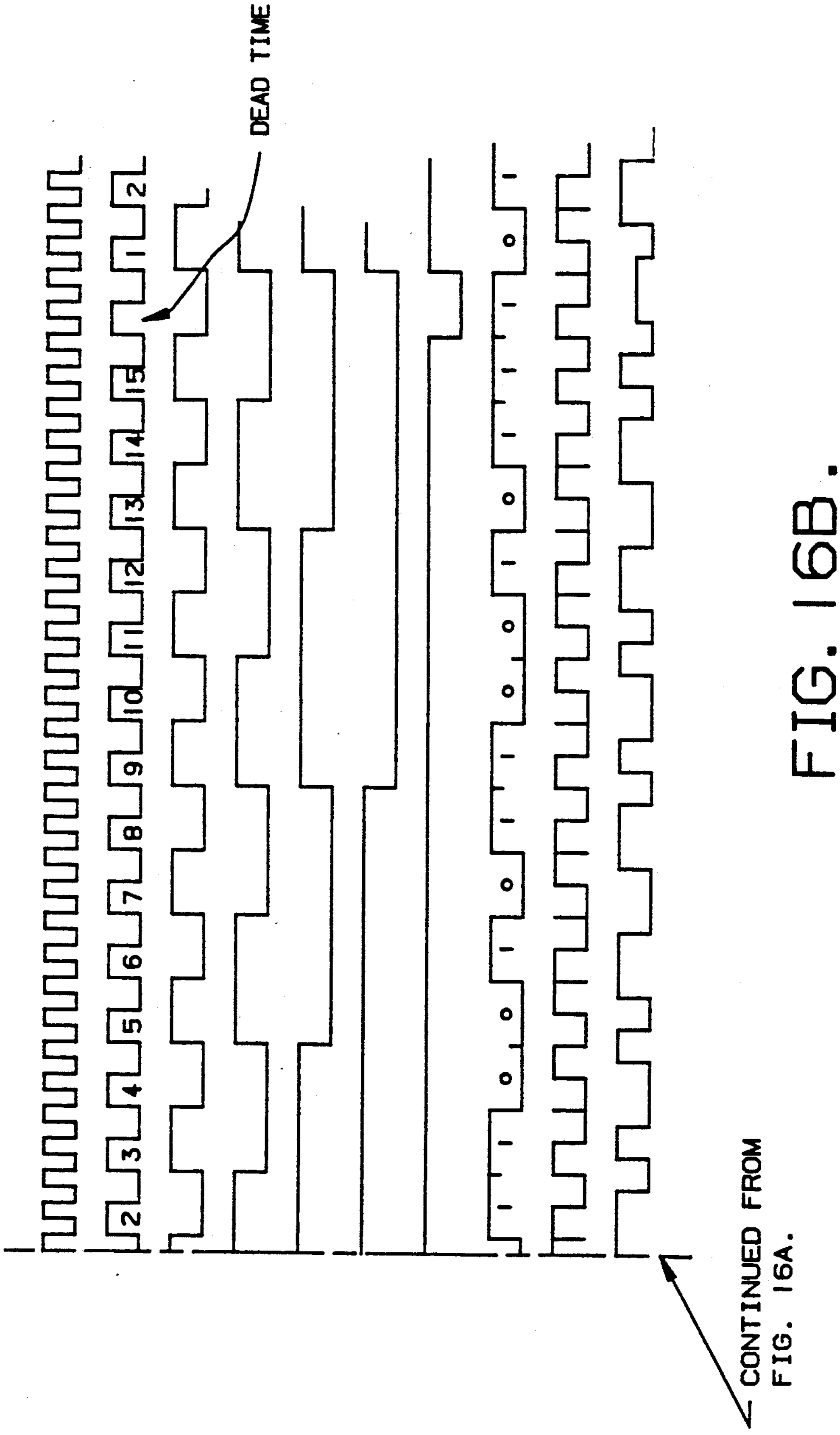

FIG. 16 illustrates the timing diagram for the Manchester encoder 54. As can be seen from the timing diagram, the Manchester encoder 54 produces a signal that is on the average, zero volts. Such a signal is very important when a carrier frequency is being modulated and controlled by a voltage controlled oscillator. The use of the Manchester encoder 54 ensures that, on the average, the encoded signal produces the carrier frequency.

Figure 17:
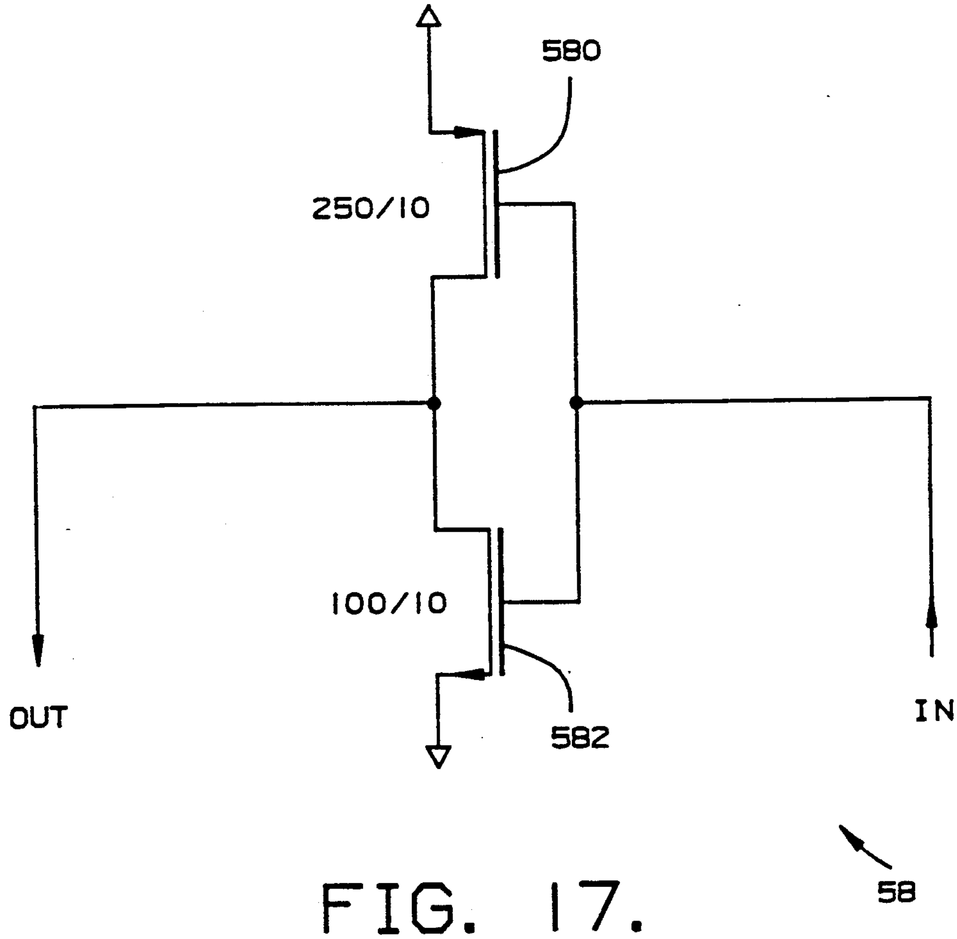
FIG. 17 illustrates the details of the loop filter amplifier 58 of FIG. 2.

FIG. 17 illustrates the loop filter amplifier 58 where, once again, the sizing of the transistors 580 and 582 is illustrated by the sizing numbers adjacent thereto.

The filter 56 can be ordinary 3 pole, or if higher accuracy is required, a 5 pole filter which will produce a time constant of approximately 40 seconds allowing the voltage controlled oscillator 36 to receive a very steady input signal. One of ordinary skill in the art can provide an appropriate filter by reviewing a filters designs book on phase locked loops such as the Phase Locked Loop chapter of the Motorola MECL Data Book, 1982.

Figure 18:
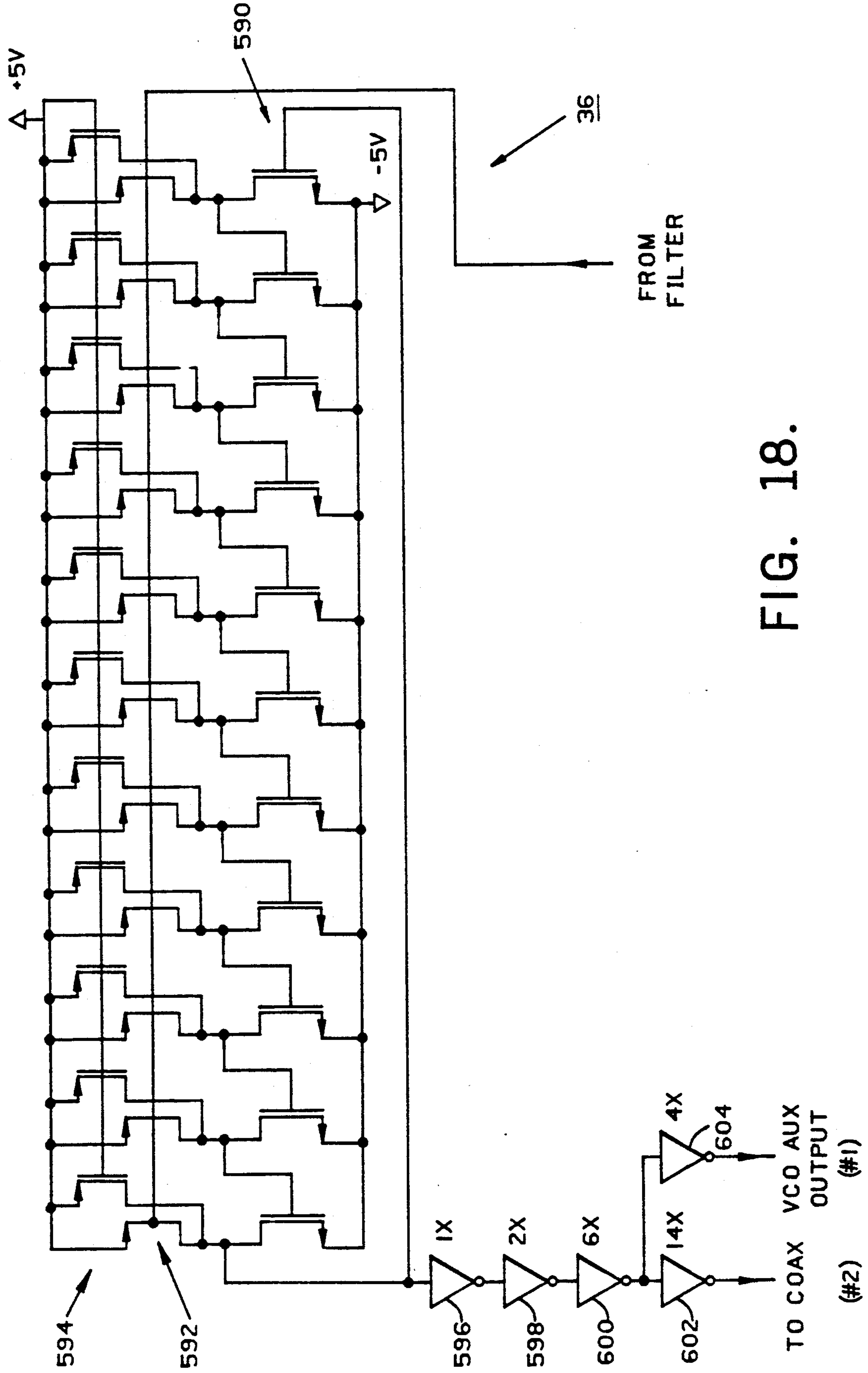
FIG. 18 illustrates the details of the voltage controlled oscillator 36 of FIG. 2.

The voltage controlled oscillator 36 is a standard ring type oscillator, as illustrated in FIG. 18. The ring type oscillator consists of cascade connected P (592 and 594) and N (590) transistors producing eleven inverter stages where the output of the transistor in the final stage is connected back to drive the input of the first stage. The output of the ring oscillator is buffered by buffers 596–602 to increase its signal level before being applied to the transformer 60 of the coaxial cable 4. The buffers, once again, indicate transistor sizing. An auxiliary output is provided through buffer 604 which is connected to an external pin of chip 30 for connection to the ripple counter 32. The voltage controlled oscillator 36 produces greater than 60 dB signal to noise. Each channel is 44.7 kHz wide, allowing 128 channels within one octave and thereby eliminating harmonic distortion considerations. The voltage controlled oscillator 36 is not hard wired back to the ripple counter 32 so that an external voltage controlled oscillator can be used, if desired.

Figure 19:
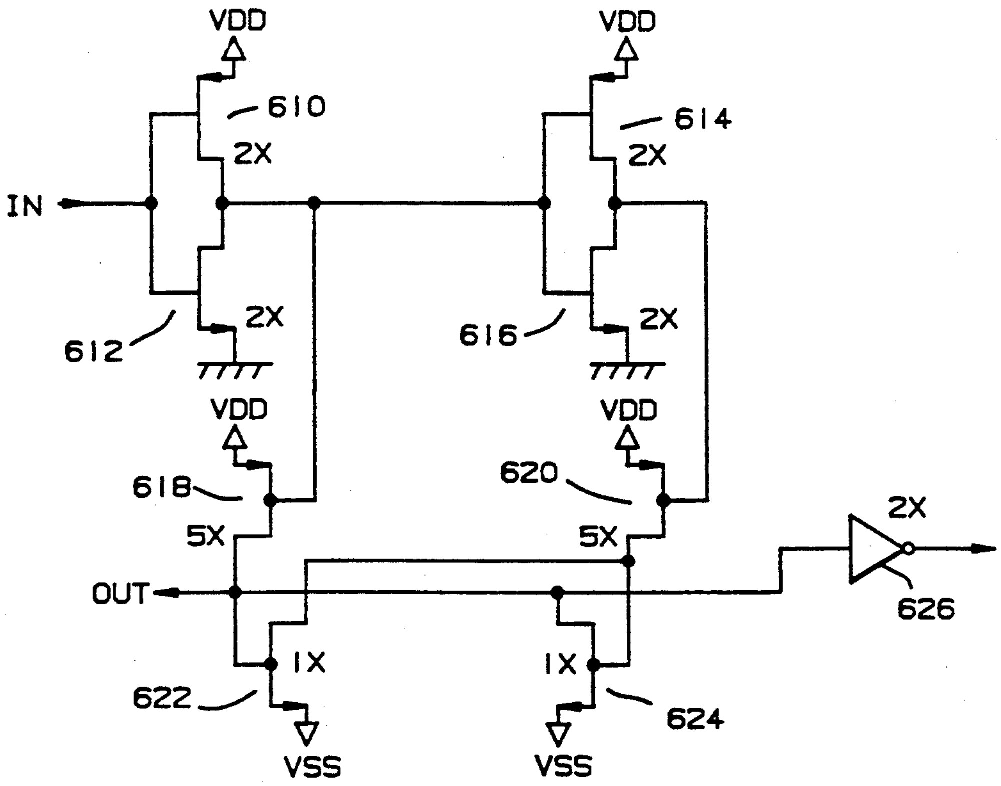
FIG. 19 illustrates a typical level shift circuit which allows the inputs to the integrated circuit 30 of FIG. 2 to match the signal requirements of the circuit 30.

To allow the present invention to interface conveniently with other devices which use zero to five volts while still maintaining plus five to minus five volt logic within the chip, level shift circuits are provided between each input pin and the internal chip circuits and between the internal chip circuit and each output pin. An example of a level shift circuit is illustrated in FIG. 19 where, once again, the appropriate transistor sizings are indicated. Each level shift circuit includes transistors 610–624 and buffer 626.

Figure 20:
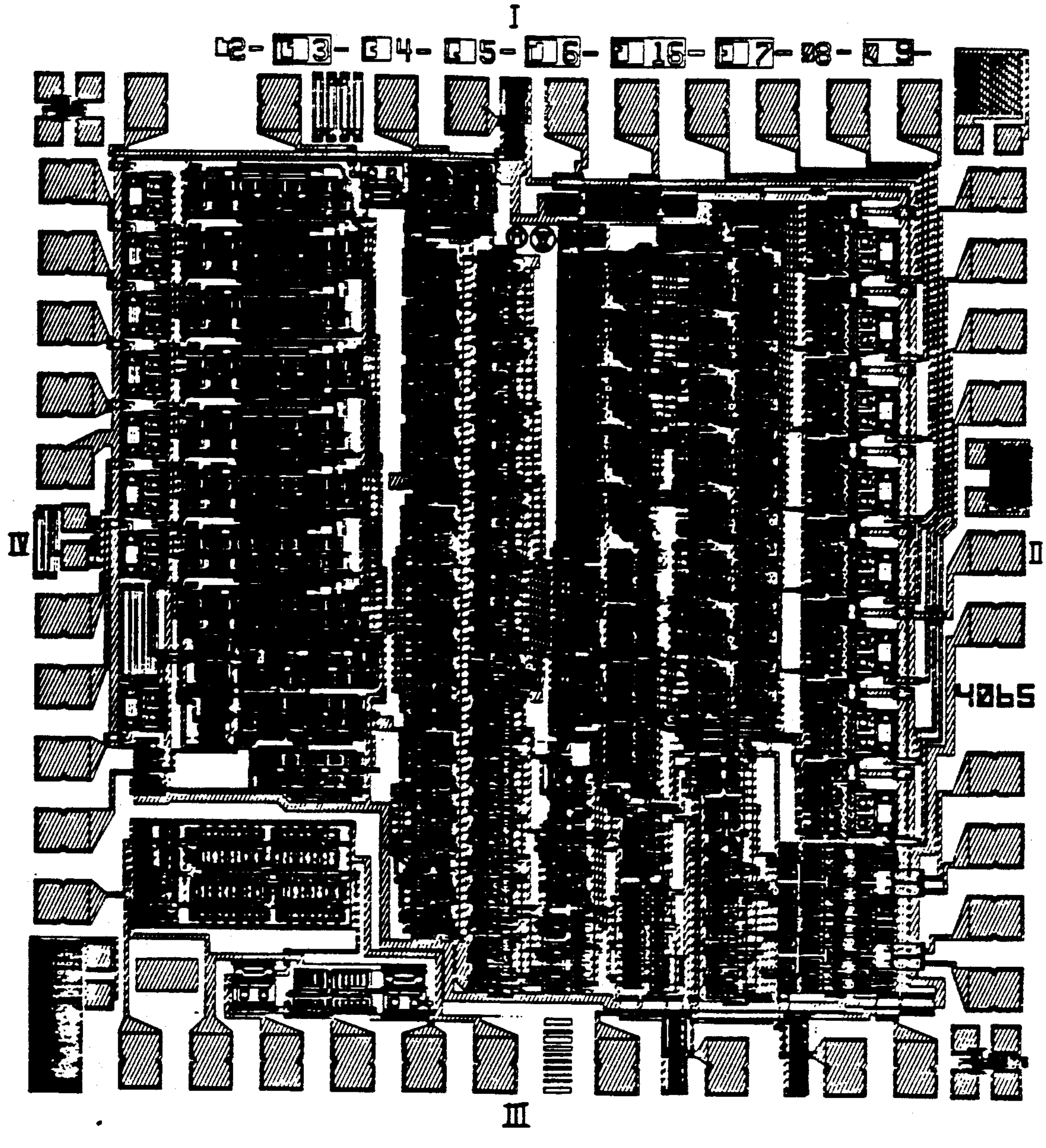
FIG. 20 illustrates a composite mask of the integrated circuit 30 of the present invention.
Figure 21A:
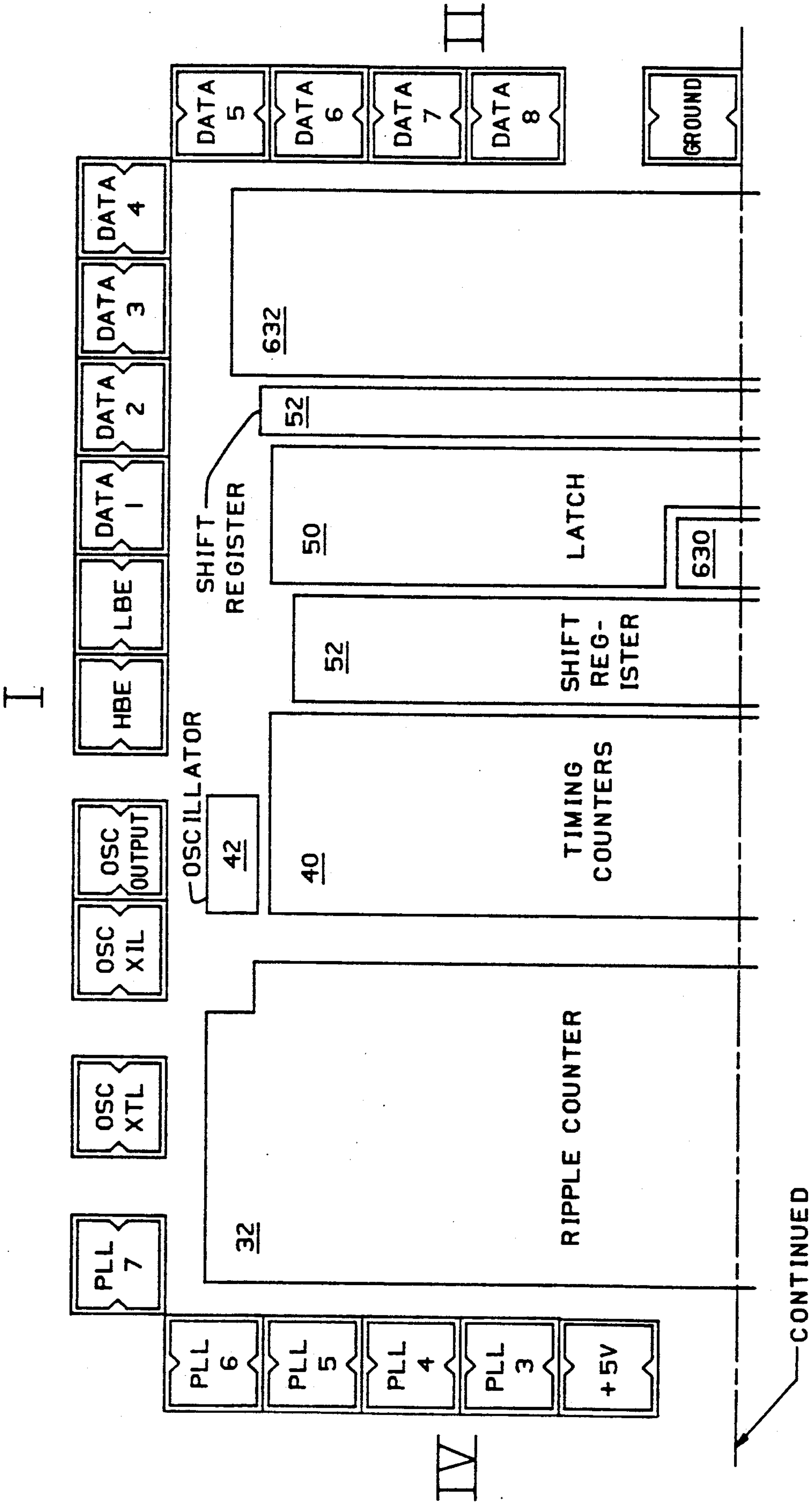
FIGS. 21A and 21B, depicts the layout of the mask.
Figure 21B:
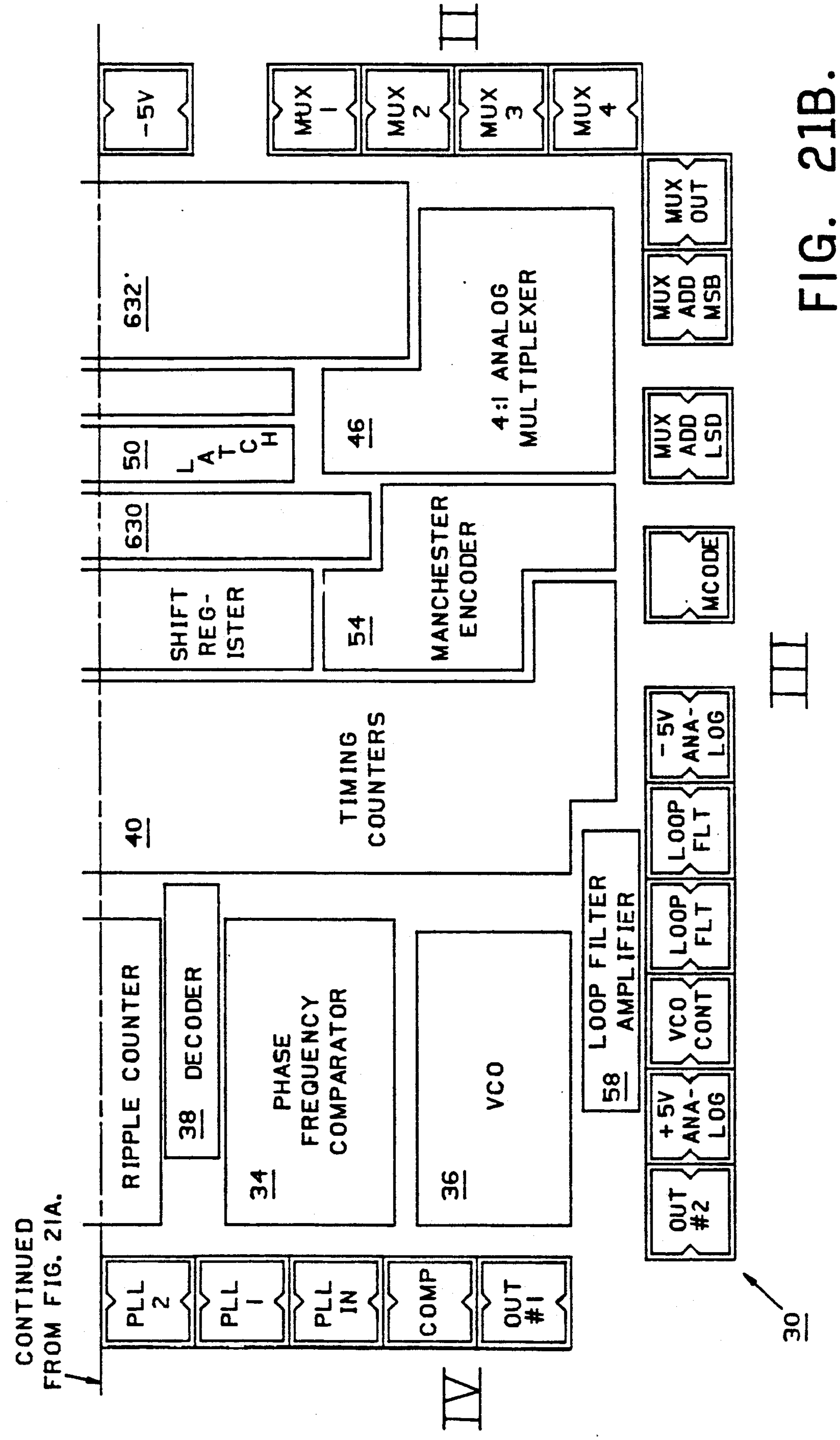

FIGS. 20 and 21, including 21A and 21B, illustrate the mask and layout, respectively, of the integrated circuit analog serial bus interface chip 30, where FIG. 20 illustrates the mask layout and FIG. 21 illustrates the relationship between the various circuits and between the circuits and the exterior chip connections. As can be seen in FIGS. 21A and 21B, the ripple counter 32 is located (FIG. 21A) in the upper left hand corner associated with side IV and with the phase locked loop bonding tabs which set the frequency of the frequency synthesizer. Below the ripple counter 32 is the decoder 38 (FIG. 21B) followed by the phase/frequency comparator 34. The voltage controlled oscillator 36 is generally located in the lower left hand corner and is surrounded by power supply lines, as illustrated in FIG. 20, so that the analog output signal produced by the voltage controlled oscillator 36 will be relatively free of the noise generated by the digital circuitry on the chip. This physical isolation is also provided to loop filter 58 which is below the voltage controlled oscillator 36. The voltage controlled oscillator 36 and amplifier 58 are powered by analog power supply bonding tabs located along the bottom side (side III) of the chip while the digital circuitry has its own power supply tabs located on sides II and IV. The separation of the power supply bonding tabs reduces noise coupled to the network.

In the center of the chip, running vertically, are the timing counters 40. The timing counters 40 are located centrally because they must provide timing signals throughout the chip. The central location minimizes the length of high and low frequency signal runs within the chip. In the center of the timing counters 52 is a 10 kHz line running from one count stage at the bottom to a count stage at the top. The 10 kHz signal line is shielded on both sides by power supply lines. The oscillator 42 driving the chip is located above the timing counters 40.

The latch 50 is located between the folded shift registers 52 so that each shift register will receive its data from the closest latch. The two bits of the shift register 52 which receive the address from the analog multiplexer 46 (FIG. 21B) are located adjacent to the multiplexer 46. The output of the shift register 52 is buffered through buffers 630 and coupled to the Manchester encoder 54 located next to the end of the register 52 where the serial bits emerge. The analog multiplexer 46 is located in the bottom right corner of the chip. The location in the corner allows the inputs to enter and the output to exit the chip without the need for signal crossover lines, this arrangement reduces noise coupled from the chip 30. On the right side of the chip are level shift circuits 632 which match the input signals from the analog-to-digital converter 48 with the signal level of the chip 30.

As can be seen from the pin layout in FIGS. 21A and 21B, all digital signals are generally on the upper half of the chip while all analog signals are on the lower half of the chip. This arrangement, once again, isolates noise sensitive analog signal lines from the noise creating digital signal input lines. The high frequency inputs for the oscillator crystal 44 are located at the top (side I) as far from the channel signal (output #2, side III) produced by the voltage controlled oscillator 31. The lead tabs each have notches which divide each tab into two portions. Each portion is large enough to accept a lead, so that if a bonding error occurs the bonder can try again. The chip is oriented in its chip carrier with sides I and III toward the narrow side of the carrier to minimize the length of the analog signal lines, thereby increasing noise immunity.

The chip 30 is created using a standard CMOS process, the details of which are available from a plurality of sources, including:

*Modern MOS Technology,* Dewitt G. Ong, McGraw-Hill, 1984.

*The Physics of Semiconductor Devices,* D. M. Sze, Wiley & Sons, 1984.

*Microelectronics-Processing & Device Design,* Roy A. Colclaser, Wiley & Sons, 1980.

*VLSI Technology,* S. M. Sze, McGraw-Hill, 1983.

*Integrated Circuit Fabrication Technology,* David J. Elliot, McGraw-Hill, 1982.

One of ordinary skill in the art can create a chip with a layout, as illustrated in FIG. 21 from the teachings of the above-listed books incorporated by reference herein.

Figure 22:
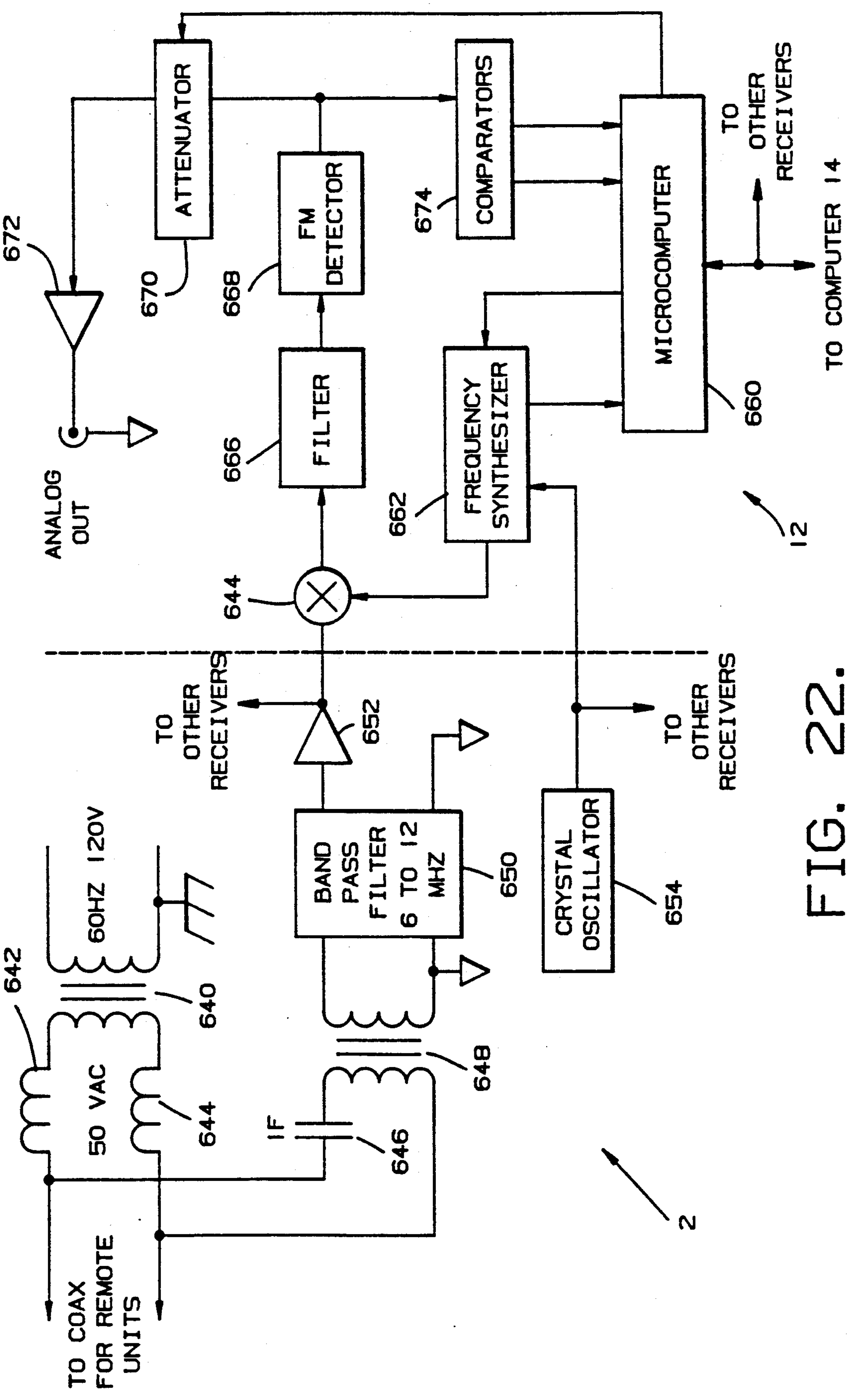
FIG. 22 illustrates the components of the buffer 2 and receivers 12 of FIG. 1.

As mentioned previously with respect to FIG. 1, the coaxial cable 4 is typically supplied with 60 cycle, 28 volt alternating current from a power supply in buffer 2, as illustrated in FIG. 22. A transformer 640 converts the 120 volt, 60 cycle signal into the signal which is coupled to the coaxial cable 4 through inductors 642 and 644 of 51 pico henrys each. The returning frequency division multiplexed signal from the remote units 6 is coupled through a capacitor 646 and an ordinary radio frequency transformer 648. The signal is then passed through a six to twelve megahertz bandpass filter 650 after which it is amplified by an amplifier unit 652 which comprises series coupled HA-2540 and HA-5002 amplifiers available from Harris. The buffer board also includes a crystal oscillator 654 which is tuned to a reference of 3.579 MHz and a divide by 10 circuit which divides the reference frequency by a factor of 10.

Each receiver 6, as illustrated in FIG. 22, includes a microcomputer 660 which controls a frequency synthesizer 662 to synthesize the carrier frequency of the remote unit to which the receiver corresponds. The frequency synthesizer 662 includes a programmable frequency divider which converts the crystal oscillator signal to the appropriate carrier frequency. The frequency synthesizer 662 includes a frequency synthesizer model MC145156 from Motorola, a divider model MC3393 from Motorola and voltage controlled oscillator Model C1648 from Motorola and a filter which is a 40 megahertz standard design lowpass filter designed to remove high frequency noise from the synthesized carrier signal. The synthesized carrier signal is mixed in mixer 664, such as an SL6440 from Plessey, with the modulated carriers for the various receivers provided by amplifier 652. The mixed signal is provided to a crystal filter 666 operating at a frequency of 21.4 megahertz. The crystal filter 666 selects only the channel of interest and attenuates all others. The output from the crystal filter 666 is applied to an FM detector 668 such as a CA3089 available from RCA. The FM detector demodulates and removes the carrier leaving either the Manchester encoded signal or the high/low frequency analog signal transmitted by the respective remote unit 6.

If an analog signal is being transmitted by the remote unit 6, the demodulated signal is passed through a programmable attenuator 670, made with a resistor network and an analog multiplexer, such as an MC14052. The gain controlled analog signal is then applied to an amplifier 672, such as an LM 386-4 available from National Semiconductor, before the signal is output. If the Manchester encoded signal is the signal transmitted by the corresponding remote unit 6, comparators 674, such as an LM139 available from National Semiconductor, are used to determine the state of the transmitted signal and provide same to microcomputer 660. The microcomputer is preferably an 8731, available from Intel with appropriate ROM memory for storing a control program.

Figure 23:
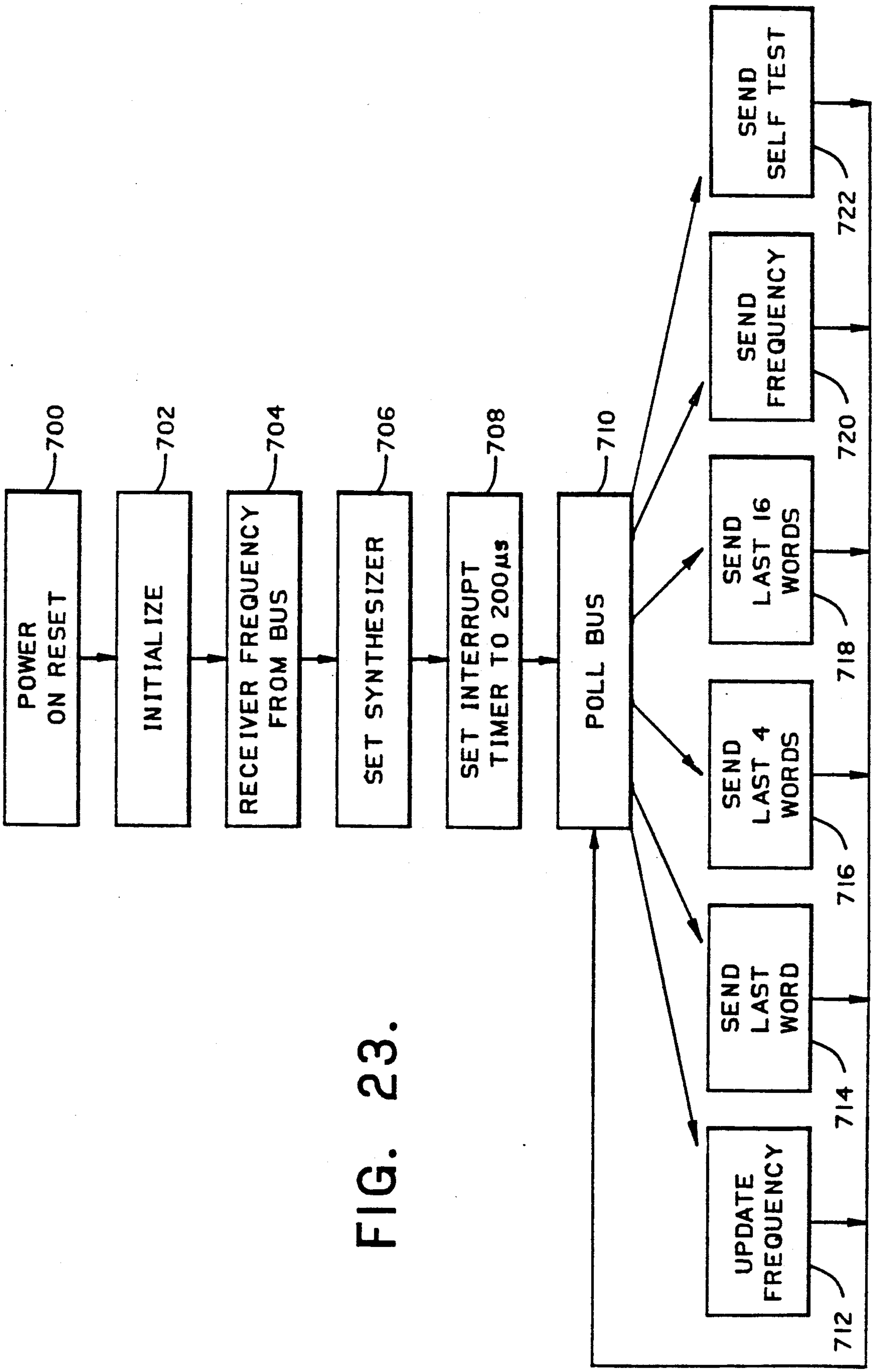
FIG. 23 is a conceptual block diagram of the process performed by the microcomputer 660 of FIG. 22.

FIG. 23 illustrates conceptually the operation of the microcomputer 660 of FIG. 22. The routine of FIG. 23 monitors a communication link to the computer 14 for commands therefrom and is interrupted by an interrupt timer to perform detection of encoded bits transmitted to the receiver 12 from the associated remote unit 6. The interrupt routine is discussed, in general, with respect to FIG. 27 and, in more detail, with respect to FIG. 28. After a power-on reset occurs 700 and the microcomputer 660 is intialized 702, the microcomputer 660 retrieves 704 the receiver frequency from the bus to computer 14 and loads 706 the frequency synthesizer 662 with the appropriate frequency designation word. Next, the processor 660 sets 708 the interrupt timer to 200 microseconds. That is, at the end of 200 microseconds the processor will examine the comparators 674 to determine whether a start bit has been received from the Manchester encoder 54 of the respective remote unit 6. The microcomputer 660 then enters into a loop wherein the bus from computer 14 is periodically examined to determine if a command has been received from the computer 14. The commands include tasks associated with updating 712 the synthesizer frequency, sending 714 the last encoded word, sending 716 the last four encoded words, sending 718 the last sixteen encoded words, sending 720 the current frequency and sending 722 a self-test.

Figure 24A:
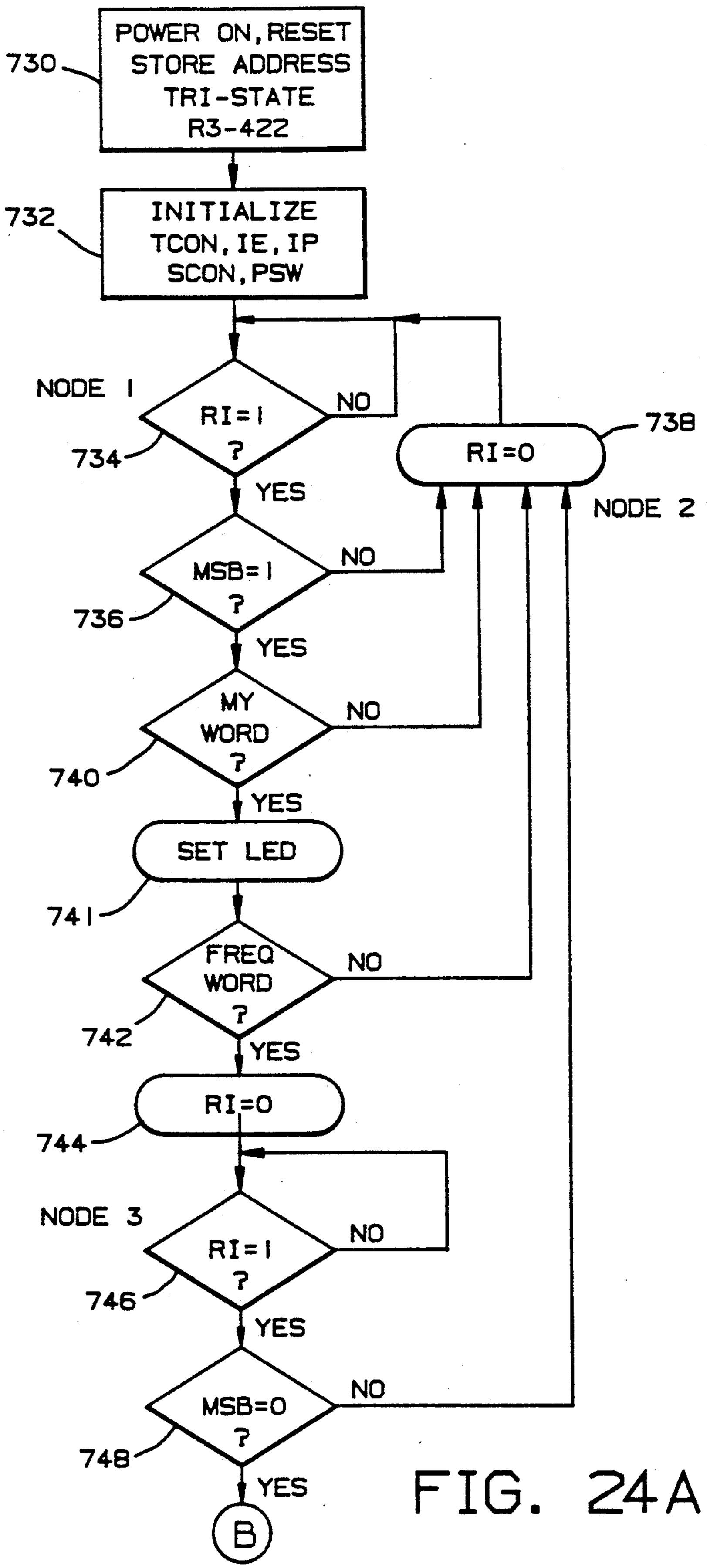
FIGS. 24A-24F, illustrates the process of FIG. 23 in greater detail.
Figure 24B:
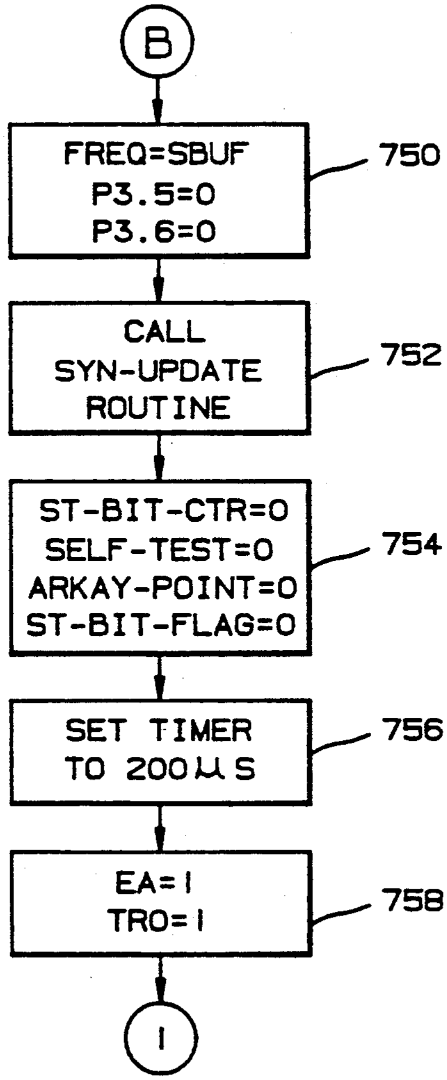

At the beginning of the control routine, as illustrated in FIG. 24A during the power on reset function, the address for the input from the computer 14 bus is stored 730, after which the count register (TCON), interrupt enable register (IE), interruptppriority register (IP), serial count register (SCON) and program status word register (PSW) are initialized 732. Next, the microcomputer 660 begins monitoring the bus to computer 14 to determine whether a frequency word for this particular microcomputer (receiver) has been received. The first step is to examine 734 the receive interrupt flag to determine whether it has been set, indicating that the frequency word has been received. If the receive/interrupt flag has been set, then the microcomputer 660 examines 736 the most significant bit to determine whether it is a 1. If it is not a 1, the receive interrupt flag is set 738 to 0 and the microcomputer 660 continues examining words. If the most significant bit is a 1 then the microcomputer determines 740 whether the word is addressed to itself and then determines 742 whether the word is a frequency designation word. If it is a frequency designation word, the receive interrupt flag is set 744 to 0 followed by a check 746 to determine whether there has been another receive interrupt. If an interrupt has not occurred, then the most significant bit of a valid frequency (0–127) must always be zero. This serves as an additional check to make sure that the data is valid before the synthesizer is loaded. Once the microcomputer 660 has determined that the received word is the frequency designation word, the frequency is stored in the buffer for the frequency synthesizer. P3.5 and P3.6 (FIG. 24B) are microcomputer 660 output lines used to load data serially into the synthesizer 662. Next, the synthesizer update routine is called 752. This routine loads the designated frequency into the frequency synthesizer 662 and will be discussed in more detail with respect to FIG. 25. Once the frequency has been set, various flags and counters are set 754, after which the interrupt timer is set 756 to 200 microseconds. Next, the interrupt enable flag is set and the timer count register is started 758.

Figure 24C:
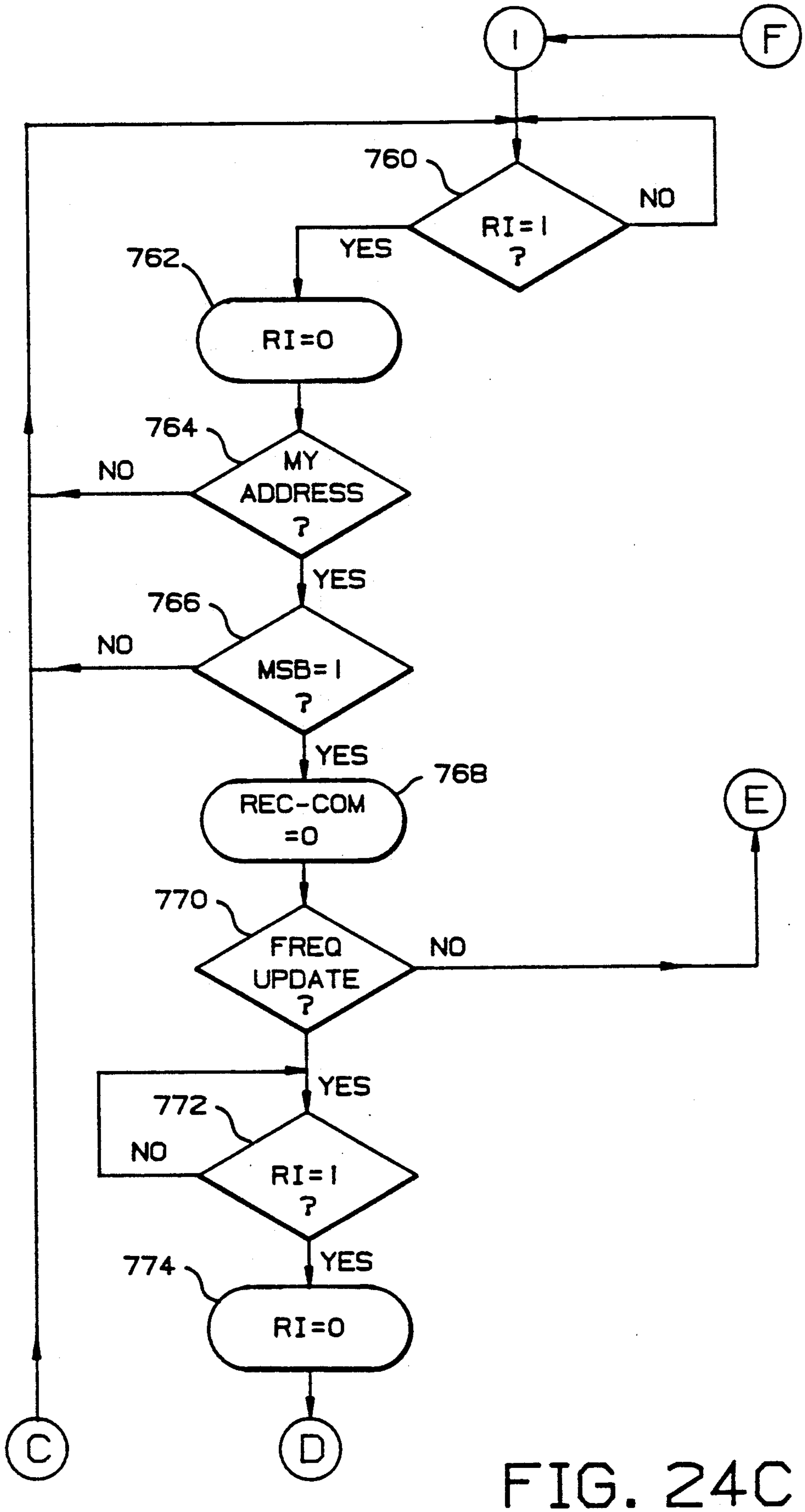
Figure 24D:
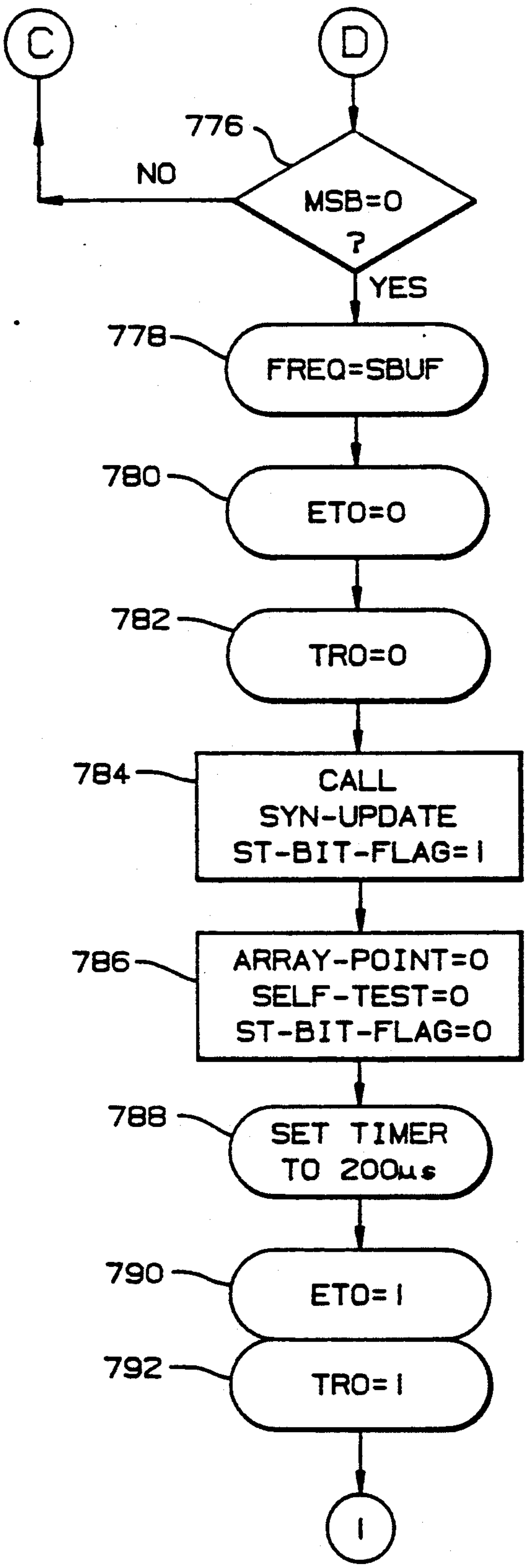
Figure 24E:
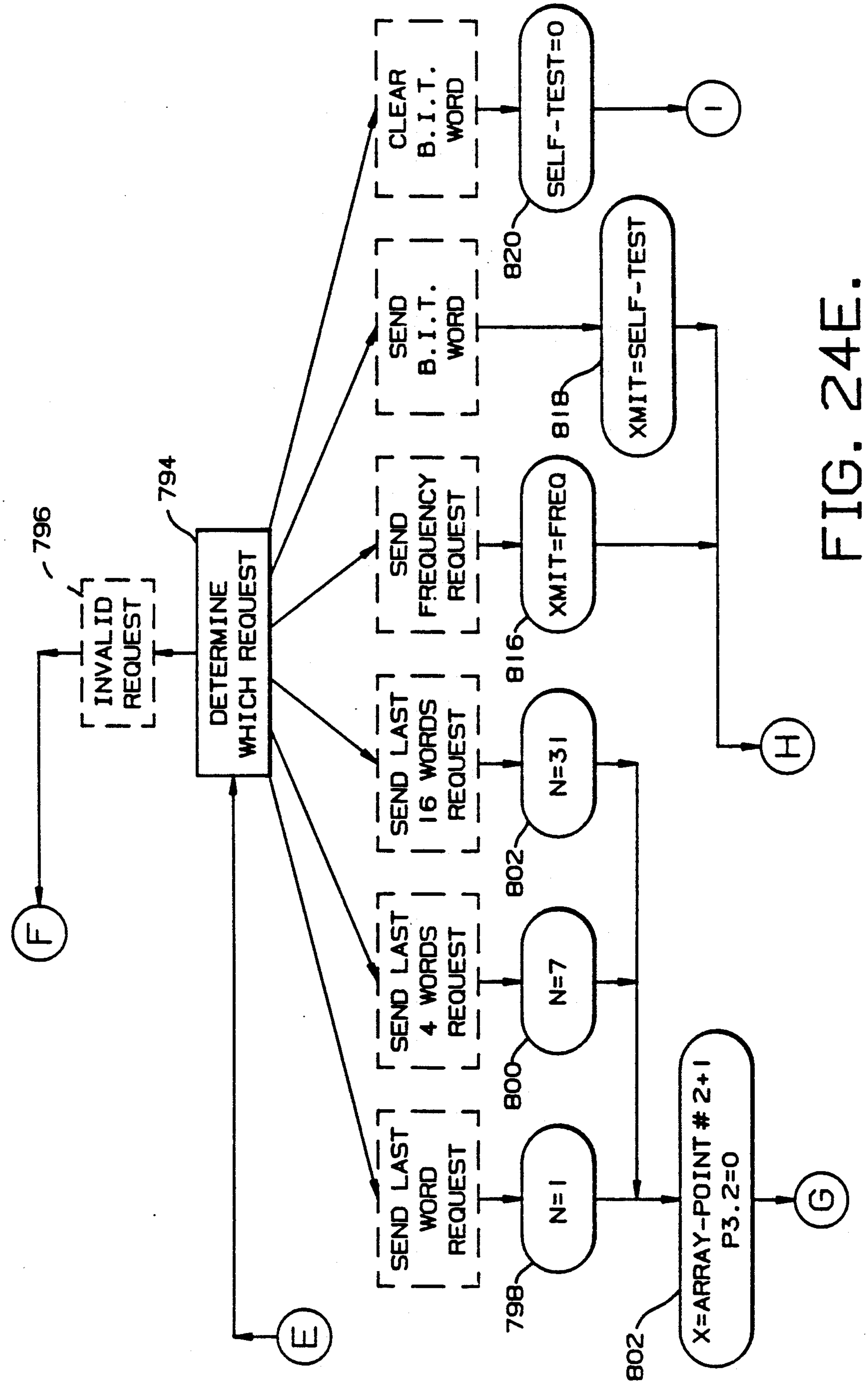
Figure 24F:
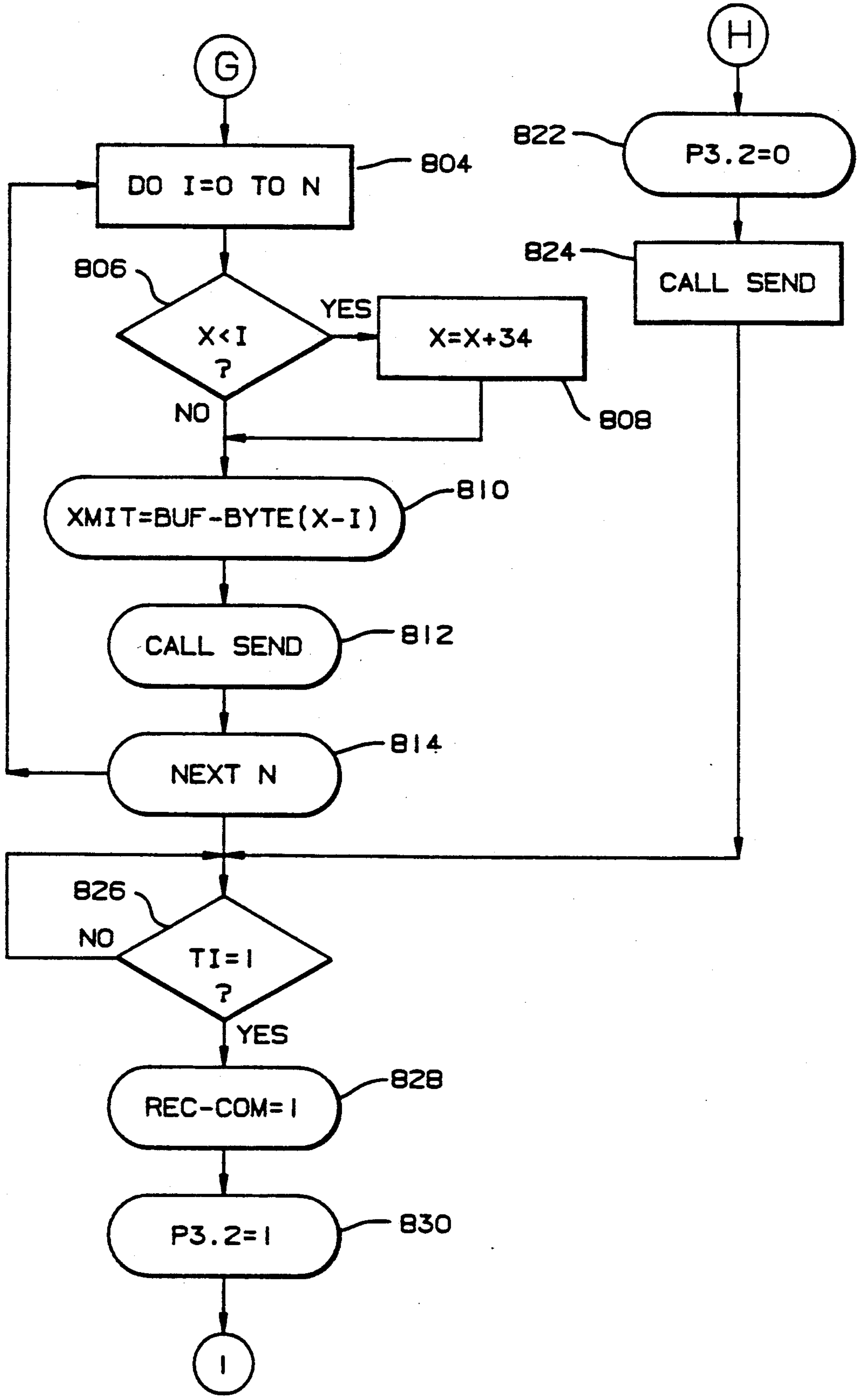

The loop depicted in FIG. 23 is illustrated in more detail in FIGS. 24C and 24F. The program enters into a loop during which the receive interrupt flag is checked 760 (FIG. 24C) to determined whether a word has been received. If a word has been received, the interrupt flag is set 762 to 0 zero followed by a determination 764 as to whether the word is addressed to this receiver. If the word is addressed to this receiver, a check 766 is made to determine whether the most significant bit is 1. If the most significant bit is 1, the flag which indicates that a communication has been received is set 768 to 0. Next, a check 770 is made to determine whether the word is a frequency update command and if so, the receiver enters a loop in which the receive interrupt flag is checked 772 until a word has been received. The receive interrupt flag is then set 774 to 0 after which the most significant bit is examined 776 (FIG. 24D) to determine whether it is 0. If so, it indicates that a correct frequency specification word has been received and the frequency is loaded 778 into the frequency synthesizer variable. The interrupt timer is then disabled 780 and the counter is disabled 782. Next, the synthesizer update subroutine is called 784 to update the frequency produced by the synthesizer 662. After the frequency update, the appropriate pointers and flags are updated 786 followed by the setting 788 of the interrupt timer to 200 microseconds. Once the interrupt timer has been set, the timer is enabled 790 and the timer count register is also enabled 792.

If the word received was not a frequency update word, then the processor determines 794 (FIG. 24E) whether a valid request has been received and if so, executes the appropriate function. If an invalid request has been received 796, the bad word is just ignored.

If a command for sending words is detected, an array counter is set 798–802 to the appropriate value. The starting address (X) of the word or words to be transmitted is then stored 802 and the process enters a loop (FIG. 24F) during which the word or words are transmitted. During this loop, the send subroutine is called 812 and will be discussed in more detail with respect to FIG. 26.

If one of the other commands has been detected, the appropriate word is loaded 816 (FIG. 24F) and 818 into the transmit buffer or the appropriate self-test flag is set 820 to 0. If the transmission of the frequency or selftest is required, the program status word bit for enabling the bus is set 822 to 0 after which the call subroutine is executed 824. When the last word has been transmitted, the transmit interrupt flag will be set to 1 and the receiving communication flag will be set 828 to 1. Next, the program status word bit is updated 830 to set the bus connection between the microcomputer 660 and the common bus to a high impedance state. The bus connection between the computer 34 and microcomputer 660 is a tristate bus in which the bus connection can be set to a high impedance state whenever the microcomputer 660 is not accessing the bus.

Figure 25:
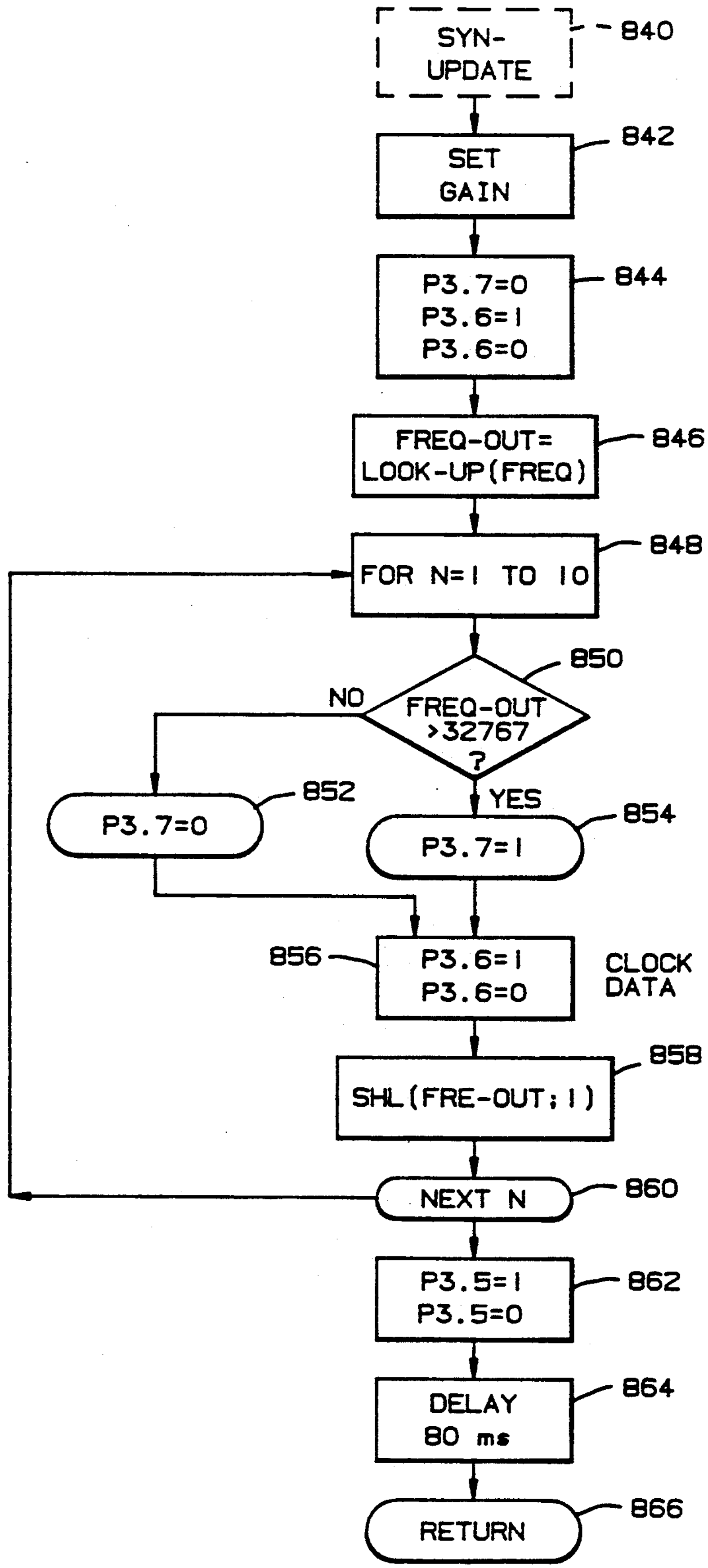
FIG. 25 illustrates the details of the frequency synthesizer update subroutine called from FIG. 24.

FIG. 25 illustrates the details of the subroutine which loads the frequency synthesizer 662 with the appropriate frequency designation word. First, the gain bits for the synthesizer are set 842 followed by the setting 844 of the indicated bits. P3.7 is the data output and P3.6 is the frequency synthesizer 66 Z clock. Step 844 clocks a 0 into the most significant bit of the synthesizer 662. Next, the bit pattern for the designated output frequency is retrieved 846 from a look-up table which includes 128 words where each word corresponds to the frequency of a possible channel to be received by the receiver 6. The look up table, which correlates frequency or channel number with synthesizer bit pattern, can be created by one or ordinary skill in the art. Next, the microcomputer 660 enters a loop. During this loop using P3.7 as the output port and P3.6 as the clock, the loop shifts 858 the data to the left and by comparing 850 the word to 32767, determines if the next data bit to the synthesizer should be a 1 or 0. That is, if the word is greater than the constant, the output bit is set 854 to 1, otherwise it is set 851 to 0. When the appropriate frequency is loaded, 30 the microcomputer 660 latches 862 the new frequency by toggling the appropriate bit of the program status word. The processor then waits 80 milliseconds to allow the synthesizer to switch to the new frequency before returning 866.

Figure 26:
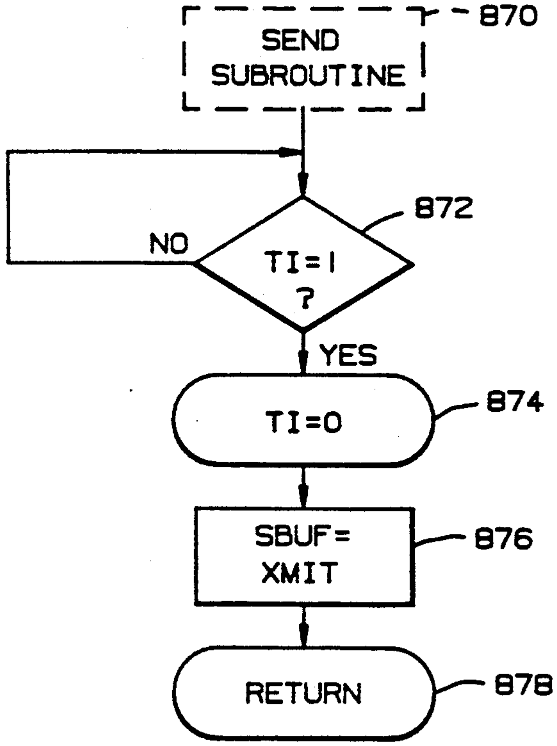
FIG. 26 illustrates the details of the send subroutine called from FIG. 24.

FIG. 26 depicts the details of the send subroutine in which the transmit interrupt flag is checked 872 to determine whether it is a 1 indicating that the bus is not occupied. If the bus is not occupied, the transmit interrupt flag is set to 0 indicating that the bus is occupied and the contents of the buffer are loaded into the transmitter. The contents of the variable XMIT is loaded into a buffer named SBUF and the buffer proceeds to shift out the word. Once the contents of the buffer are transmitted, the routine returns 878.

Figure 27A:
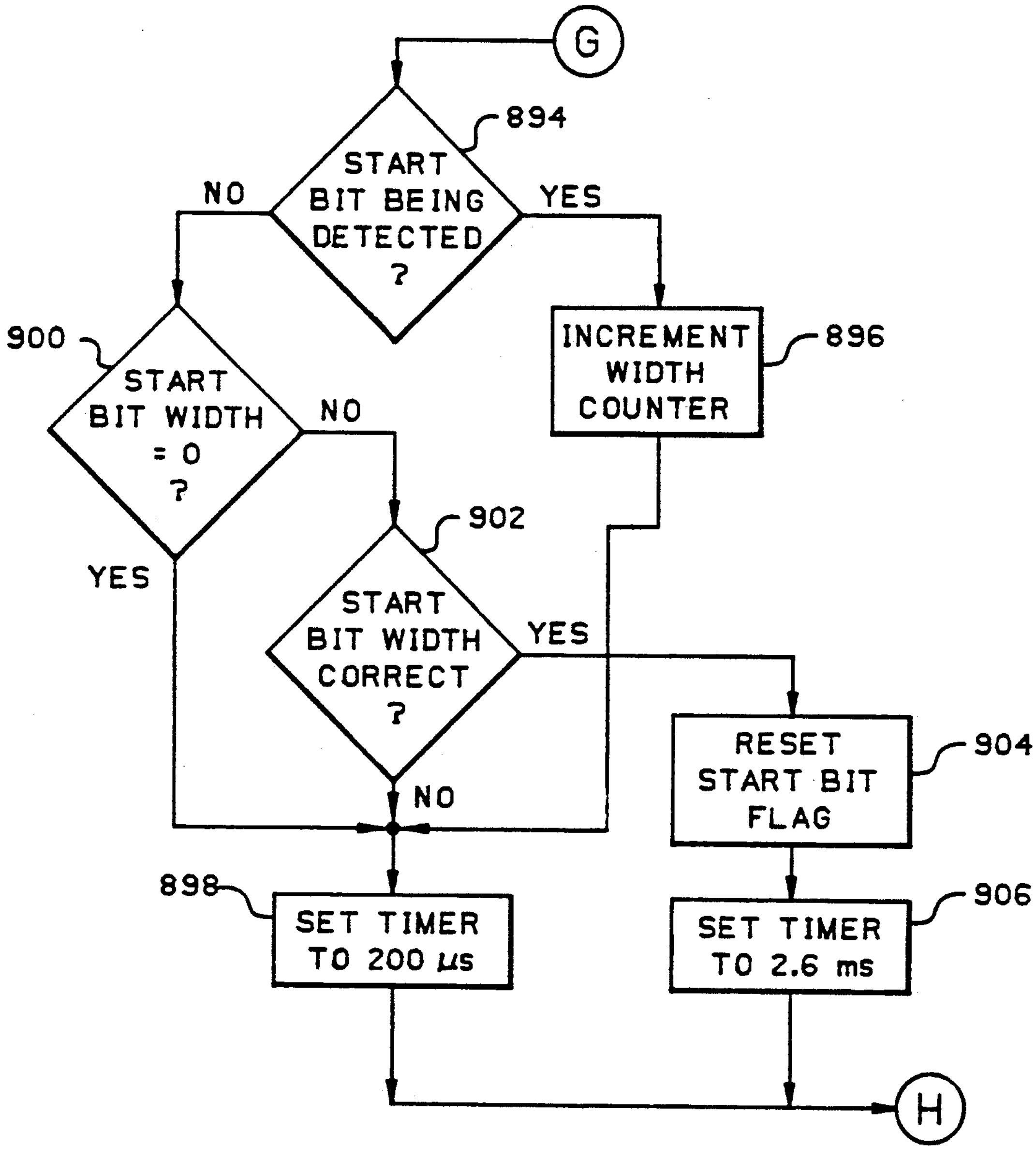
FIGS. 27A and 27B, illustrates the functions performed by the interrupt routine of the microcomputer 660 of FIG. 22.
Figure 27B:
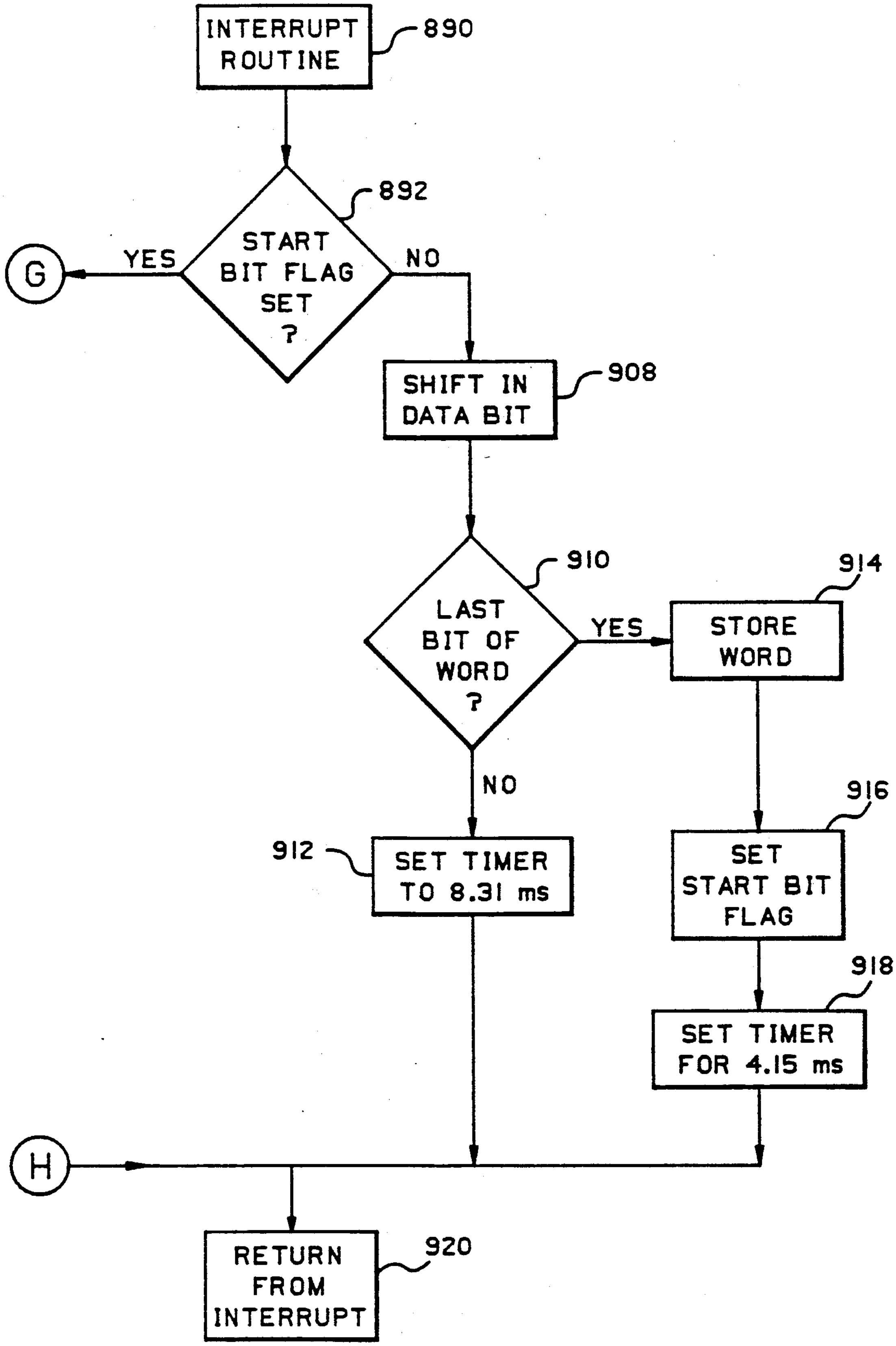

The interrupt routine, illustrated conceptually in FIGS. 27A and 27B, begins by determining 892 (FIG. 27B) whether the start bit flag is set. If the flag is set a determination is made 894 (FIG. 27A) concerning whether the bit being detected is the start bit. The start bit is detected by one of the comparators 674 outputting a signal indicating the input signal is high and the other of the comparators indicating that the input signal is low. That is, the start signal is between the high and low values, as depicted in FIG. 16A. If the start bit is being detected, the width counter is incremented 896 followed by the setting 898 of the interrupt timer to 200 microsecond, an interval that allows an accurate determination of the width and end of the start bit. That is, while the start bit is being detected, the width of the start bit is being measured by the interrupts. If the start bit is not being detected, determination is made 900 as to whether the start bit has a zero width. If so, the interrupt timer is set 898 to 200 microseconds and the microcomputer will continue to look for a start bit of non-zero width. If the start bit has a non-zero width, a determination is made 902 whether the start bit is of the correct width. If the correct width has not yet been detected, then the timer is once again set to 200 microseconds and another interrupt is awaited. If the start bit is of the correct width, the start bit flag is reset 904 and the timer between interrupts is set 906 to a longer period of 2.6 milliseconds. The 2.6 millisecond interval should cause an interrupt in the middle of the first data bit. A start bit is preferably 8.31 milliseconds wide and each data bit is 8.31 milliseconds wide.

If the start bit flag is not set and an interrupt has occurred, the microcomputer shifts 908 (FIG. 27B) in the data bit. The value of a data bit can determined by examining the output produced by only one of the comparators. The microcomputer 660 then determines 910 whether this is the last bit of the word and if not, sets the interrupt timer to the interval between data bits (8.31 milliseconds). If the bit is the last bit of the word then the word is stored 914 and the start bit flag is set 916 followed by the setting of the timer for the deadband interval between the end of the last bit and the beginning of the start bit of the next encoded word.

Figure 28A:
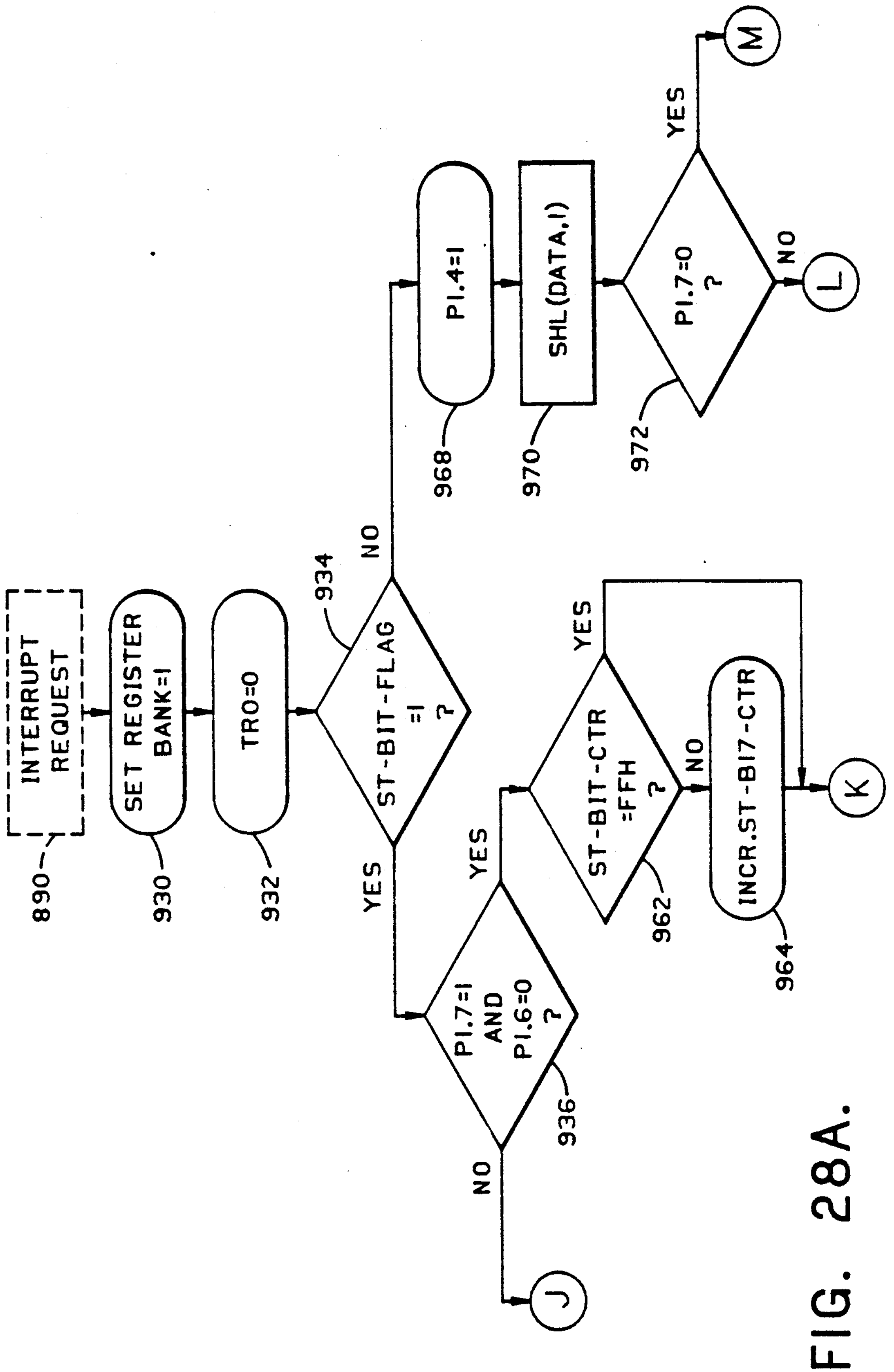
FIGS. 28A-28C, illustrates the interrupt routine in greater detail.
Figure 28B:
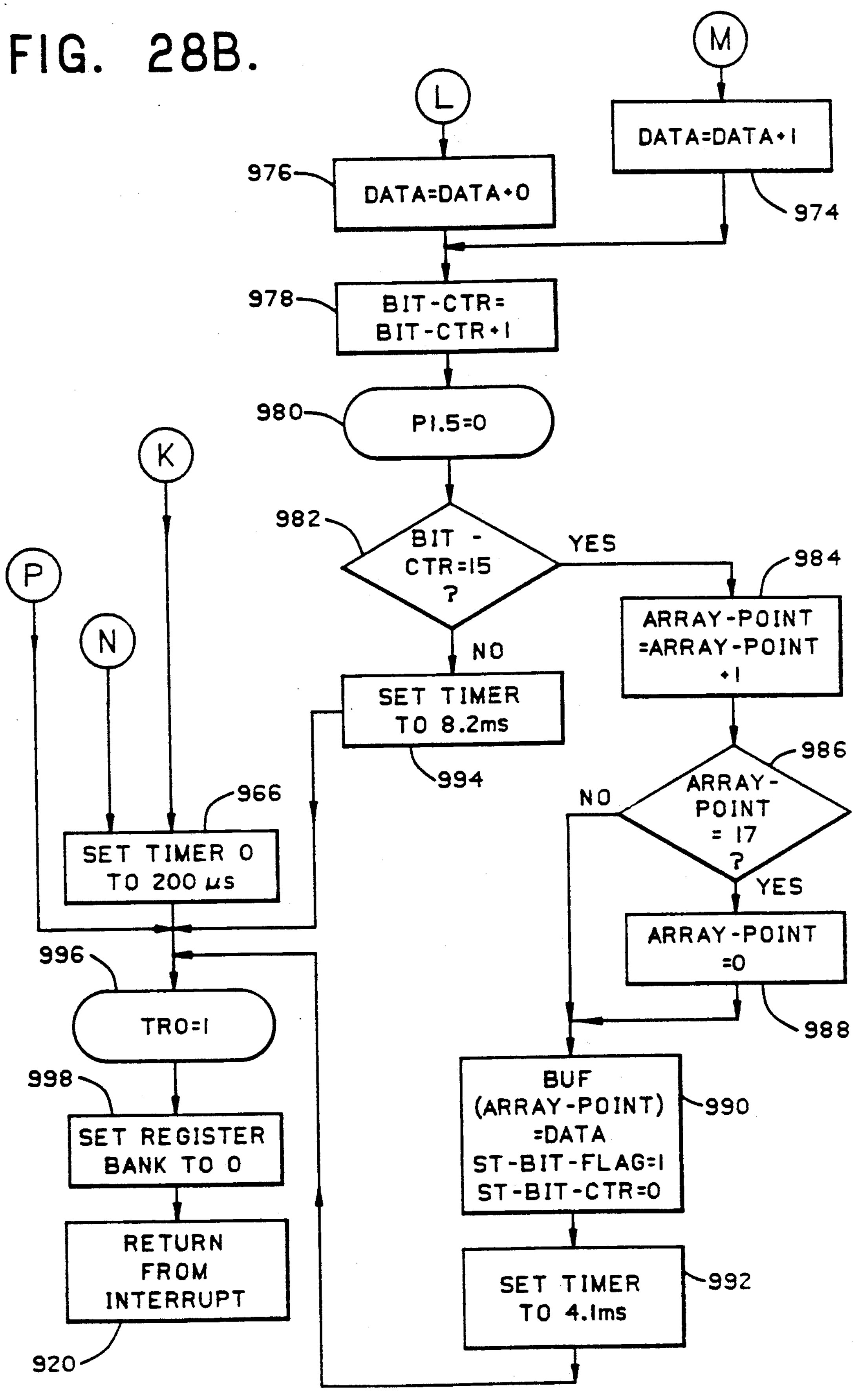
Figure 28C:
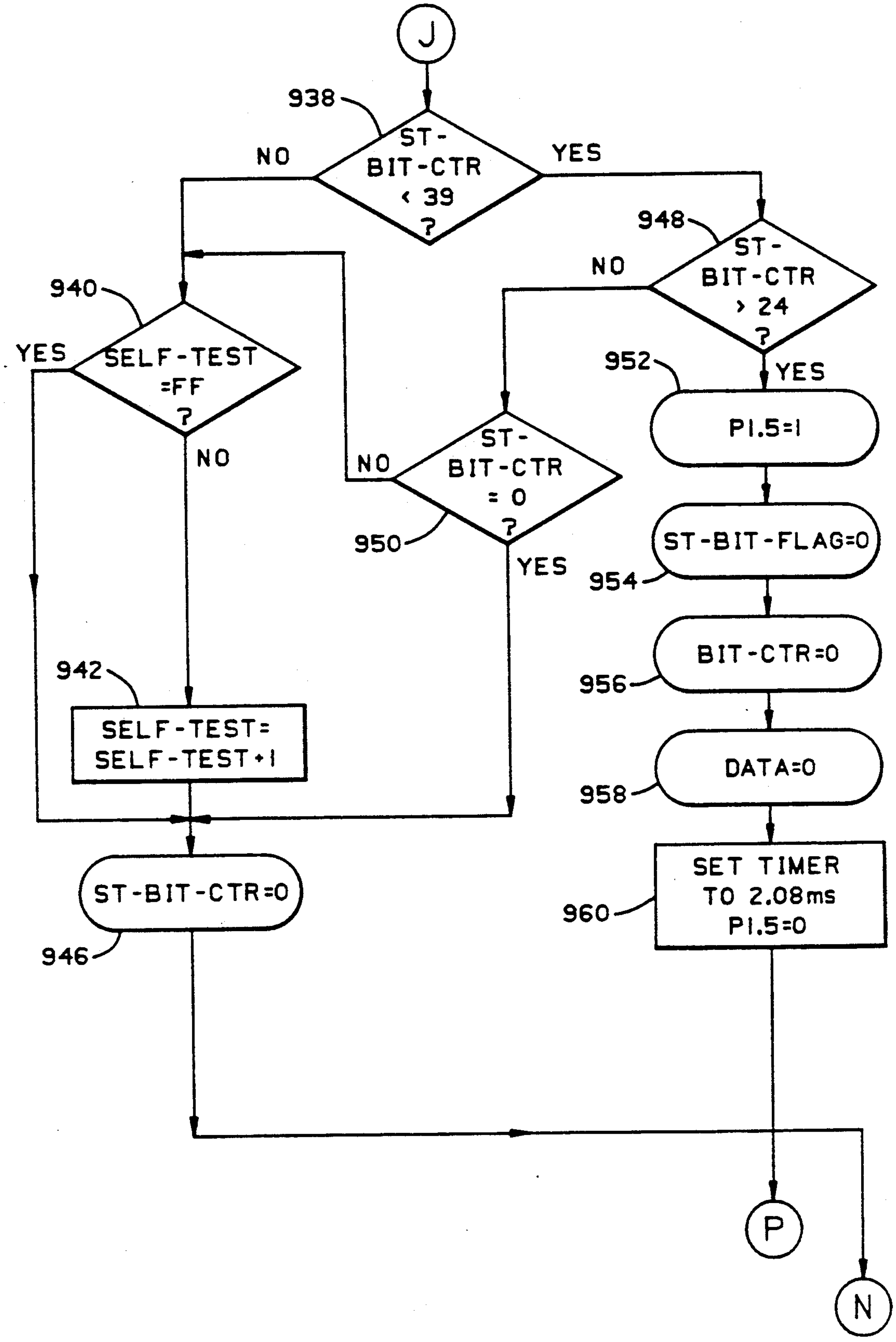

FIGS. 28A and 28B illustrate the interrupt routine of FIG. 27 in greater detail whereby the flags, status bits, etc., are examined. First, the register bank pointer to the bank, which is used for storing the incoming word is set 930 (FIG. 28A) to 1 followed by disabling 932 of the timer count register. Then the start bit flag, as previously discussed, is examined 934 followed by a comparison 936 of the indicated input bits. These bits indicate whether a start bit level is detected. If the start bit counter value is greater than 39 the value of the self-test word is examined 940 (FIG. 28C). If the value of the self-test word is not 7F, the self-test counter is incremented by one followed by a setting 946 of the start bit counter to 0. A value of 7F indicates 128 start bits have not been detected. The bit counter indicates which bit of an encoded word is presently being input. When the start bit counter is less than 39 it is examined 948 to determine whether the start bit counter is greater than or equal to 24. If not, the start bit counter is examined 950 and if it is 0, another self-test check is performed, otherwise the start bit counter is set 946 to 0. If the start bit counter is greater than or equal to 24 the program status bit indicated is set 952 to 1 followed by the setting 954–958 of various flags and values to 0. The interrupt timer is also set 960 followed by setting the program status word bit indicated to zero. If the start bit has been detected the start bit counter is examined 962 (FIG. 28A) to determine whether it is at its maximum value. If not, the start bit counter is incremented 964 followed by the setting 966 (FIG. 28B) of the interrupt timer at the value for continuing to examine the start bit.

If the start bit flag is not equal to 1, the program status bit for setting the strobe high is set 968 (FIG. 28A) to 0. Next, the data word is shifted 970 left, by one, followed by a check 972 of the input data bit indicated to determine whether the incoming bit is a 1 or a 0. If the incoming bit is equal to 1 a 1 is added 974 (FIG. 28B) to the data word. If the incoming bit status word bit is equal to 0, a 0 is added 976 to the data word. Block 976 is intended to equalize the program delay associated with adding in block 974.

Next, the bit counter is incremented 978 followed by setting 980 the test point I/O bit indicated to 0. If the bit counter is determined 982 to be equal to 15 then the end of the word has been detected and the array pointer for storing the word is updated 984. If the array pointer is equal to 17 then the last word in the array available for storing incoming data has been filled and the pointer must rotate back to the beginning of the array by setting 988 the array pointer back to 0. Once a valid array pointer has been determined, the data is stored 990 in the appropriate location of the incoming buffer. The interrupt timer is then set 992 to 4.1 milliseconds to detect the next incoming data bit. If the bit counter is not equal to 15 then the interrupt timer is set 994 to a value appropriate for detecting the next data bit. Once the interrupt timer has been set to the proper value, the counter is enabled 996 followed by the setting 998 of the register bank to 0.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described and accordingly, all suitable modifications and equivalents may be resorted to, falling within the scope of the invention.

What is claimed is:

1. A common bus multinode sensor system for at least one sensor providing a sensor signal, comprising:

a power supply;

a communication cable coupled to said power supply;

remote sensor means, coupled between said cable and said sensor, for frequency division multiplexing the sensor signal onto said cable and receiving power from said cable, said remote sensor means comprising:

programmable carrier frequency means for providing a carrier to said cable at a carrier frequency in dependence on an external input, said programmable carrier frequency means comprising: reference counter frequency means for providing a reference frequency;

a counter counting in accordance with the external input and providing a divided count frequency;

a phase/frequency comparator, operatively connected to said counter and said reference counter frequency means, for comprising the divided count frequency to the reference frequency and providing a voltage indicative of the comparison; and a voltage controlled oscillator, operatively connected to said counter and said cable, producing the carrier at a frequency dependent on the voltage; and modulation means for frequency modulating the carrier with the sensor signal; and receiver means, coupled to said cable, for demultiplexing the frequency division multiplexed sensor signal.

2. A system as recited in claim 1, wherein said modulation means comprises a filter having inputs operatively connected to said phase/frequency comparator and the sensor and an output operatively connected to said voltage controlled oscillator, for averaging the voltage produced by said phase/frequency comparator and for combining the averaged voltage with the sensor signal and providing the combination to said voltage controlled oscillator.

3. An analog serial bus interface integrated circuit couplable to sensors, a filter, an analog-to-digital converter and an oscillator reference, said circuit comprising:

a counter receiving a frequency designation word applied to said circuit;

a phase/frequency comparator connected to said counter;

an oscillator connectable to said oscillator reference;

a timing counter connected to said oscillator, said phase/frequency comparator and said analog-to-digital converter;

an analog multiplexer connectable to the sensors and said analog-to-digital converter and connected to said timing counter;

a shift register connected to said timing counter and said analog-to-digital converter;

an encoder connected to said shift register and connectable to said filter; and a voltage controlled oscillator connected to said filter.

* * * * *